(12) United States Patent
Murray

(10) Patent No.: US 11,460,974 B1
(45) Date of Patent: Oct. 4, 2022

(54) CONTENT DISCOVERY REFRESH

(71) Applicant: Snap Inc., Santa Monica, CA (US)

(72) Inventor: Michael Brian Murray, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/110,830

(22) Filed: Aug. 23, 2018

Related U.S. Application Data

(60) Provisional application No. 62/591,756, filed on Nov. 28, 2017.

(51) Int. Cl.
*G06F 3/0482* (2013.01)

(52) U.S. Cl.
CPC .................................. *G06F 3/0482* (2013.01)

(58) Field of Classification Search
None
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |

(Continued)

FOREIGN PATENT DOCUMENTS

| | | |
|---|---|---|
| CN | 109863532 A | 6/2019 |
| CN | 110168478 A | 8/2019 |

(Continued)

*Primary Examiner* — Henry Orr
(74) *Attorney, Agent, or Firm* — Schwegman Lundberg & Woessner, P.A.

(57) ABSTRACT

A client application associated with a content sharing network can include functionality for discovering content (e.g., text, image, audio, video, and other multimedia data) of the network. The content discovery functionality can be graphically represented as a feed with the top-ranking content (e.g., most relevant content, most recently created content, content created in a geographic location most proximate to a user, etc.) displayed at the top of the feed and lower-ranking content displayed at the bottom of the feed. The feed can re-order itself based on user interactions, content characteristics, system trends, and the like. A user can navigate to various portions of the feed, and the feed can continuously refresh itself to give the user an impression of an infinite feed of fresh, relevant content.

17 Claims, 17 Drawing Sheets

(56) References Cited

U.S. PATENT DOCUMENTS

| | | |
|---|---|---|
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,223,835 B1 * | 12/2015 | Mazniker ............ G06F 16/9535 |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,454,519 B1 * | 9/2016 | Keysers ................ G06F 16/48 |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0020661 A1 | 9/2005 | Cordelli |
| 2006/0257048 A1 * | 11/2006 | Lin ..................... G06K 9/00711 |
| | | 382/276 |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2008/0288494 A1 * | 11/2008 | Brogger ................ G06Q 30/02 |
| 2009/0016617 A1 | 1/2009 | Bregman-Amitai et al. |
| 2009/0049370 A1 * | 2/2009 | Faris .................. G06F 16/9577 |
| | | 715/200 |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023863 A1 * | 1/2010 | Cohen-Martin ........ G06Q 30/02 |
| | | 715/723 |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0179020 A1 * | 7/2011 | Ozzie ................. G06F 16/958 |
| | | 707/723 |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0145259 A1 * | 6/2013 | Kiefer, III ............ G06Q 30/02 |
| | | 715/249 |
| 2013/0167005 A1 * | 6/2013 | Corbett .................. G06F 16/44 |
| | | 715/234 |
| 2013/0198636 A1 * | 8/2013 | Kief ..................... G06F 3/04847 |
| | | 715/730 |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2015/0242374 A1 * | 8/2015 | Kong ................... G06F 17/212 |
| | | 715/201 |
| 2015/0249715 A1 * | 9/2015 | Helvik ............. G06F 16/24578 |
| | | 709/204 |
| 2015/0355795 A1 * | 12/2015 | Falkenburg ........... G06F 16/958 |
| | | 715/201 |
| 2016/0134840 A1 | 5/2016 | Mcculloch |
| 2016/0234149 A1 | 8/2016 | Tsuda et al. |
| 2017/0017352 A1 * | 1/2017 | Kanter ................... G06F 3/0482 |
| 2017/0060405 A1 * | 3/2017 | Voss ..................... G06F 3/04883 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0171342 A1 * | 6/2017 | Wang ................... H04L 67/306 |

(56) References Cited

U.S. PATENT DOCUMENTS

| | | |
|---|---|---|
| 2017/0192668 A1* | 7/2017 | Rao .................... G06F 3/04883 |
| 2017/0199855 A1 | 7/2017 | Fishbeck |
| 2017/0228114 A1* | 8/2017 | Brett ................... G06F 16/9535 |
| 2017/0235848 A1 | 8/2017 | Van Deusen et al. |
| 2017/0289234 A1* | 10/2017 | Andreou ............. G06F 3/04845 |
| 2017/0310934 A1 | 10/2017 | Du et al. |
| 2017/0312634 A1 | 11/2017 | Ledoux et al. |
| 2017/0357717 A1* | 12/2017 | Hughes ................ G06F 17/212 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0122341 A1 | 1/2019 | Blackstock et al. |
| 2019/0057616 A1 | 2/2019 | Cohen et al. |
| 2019/0188920 A1 | 6/2019 | Mcphee et al. |
| 2020/0012727 A1* | 1/2020 | Lewis .................... G06Q 50/01 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

* cited by examiner

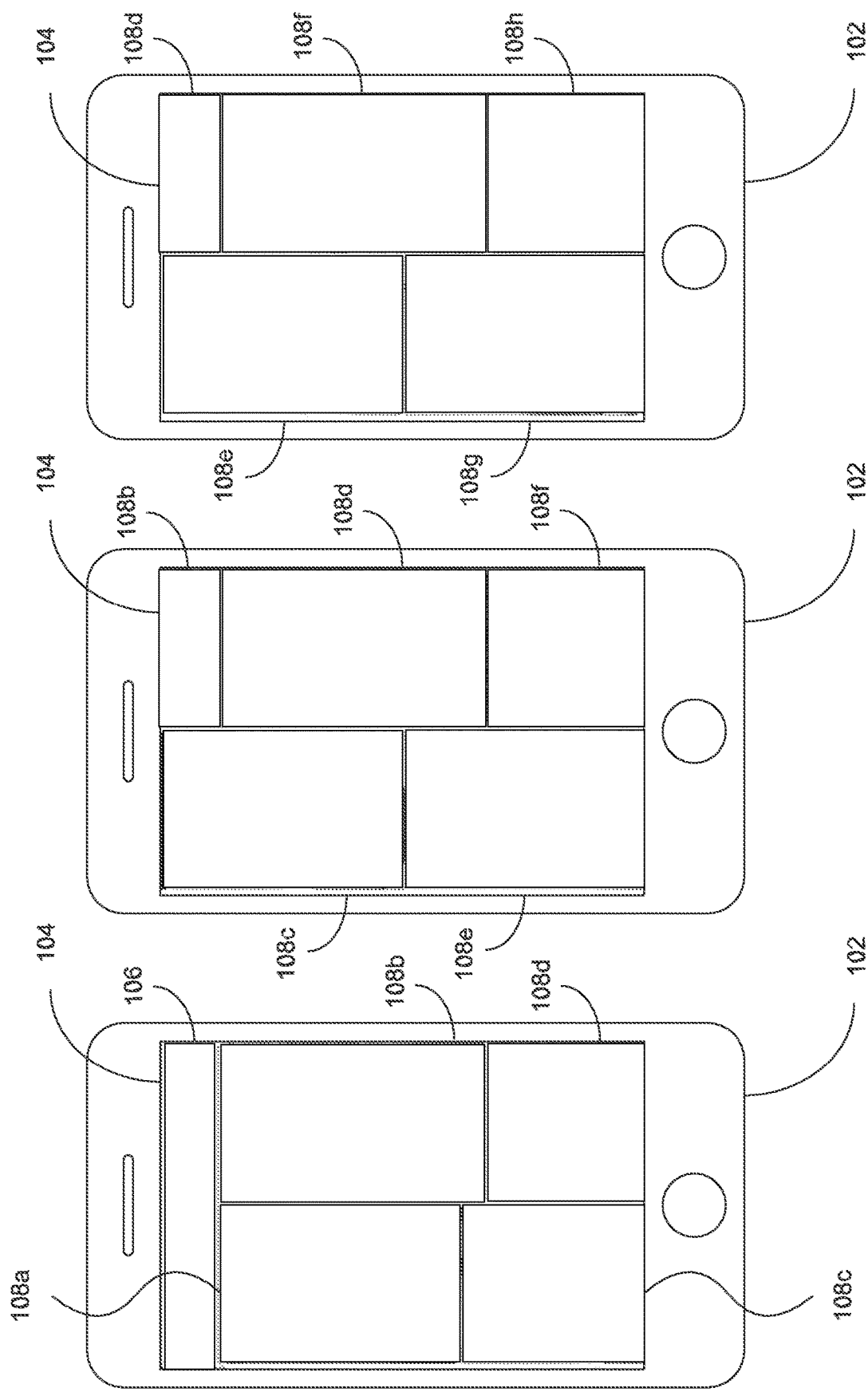

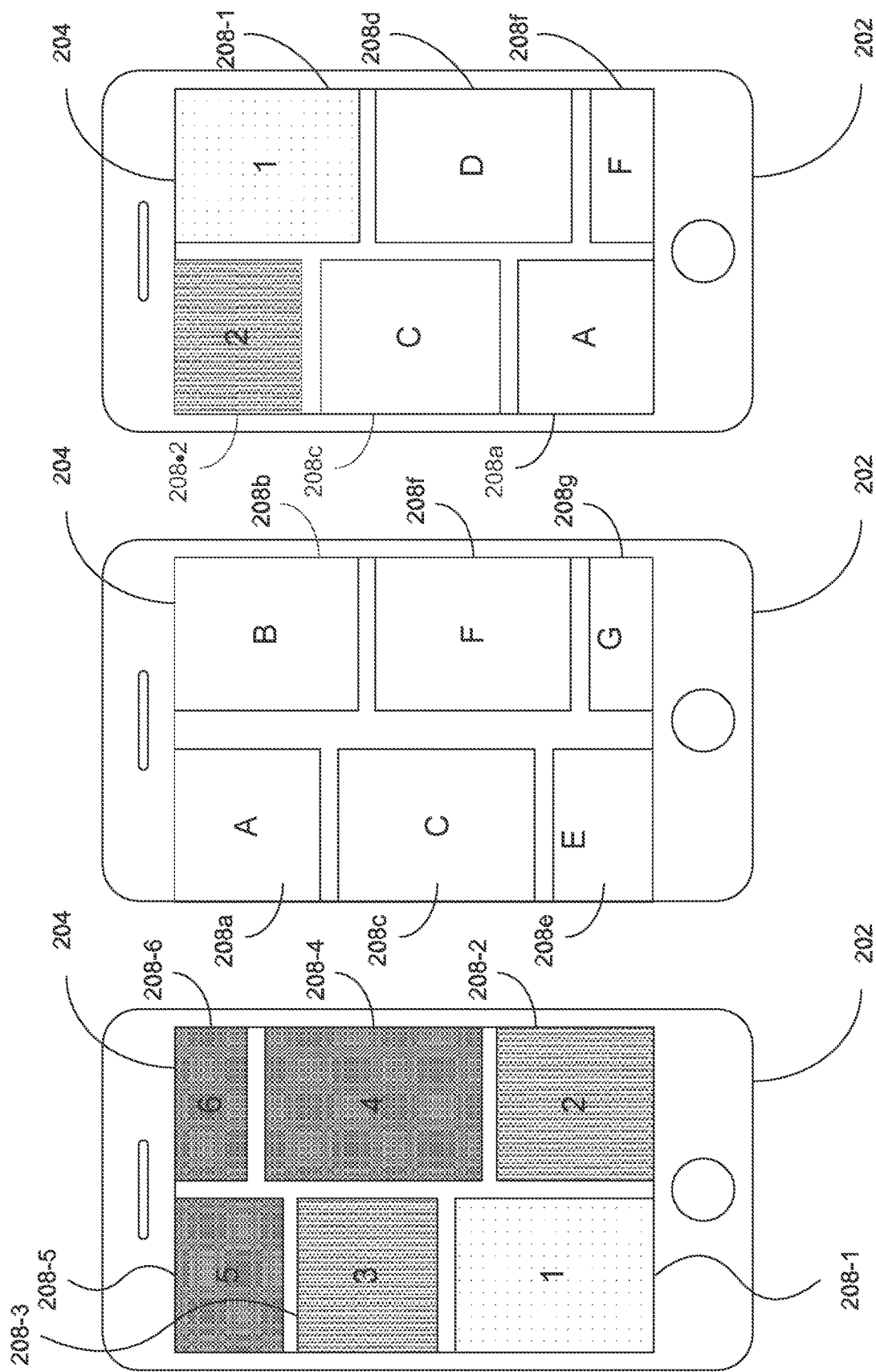

CONTENT DISCOVERY REFRESH

PRIORITY

This application claims the benefit of priority of U.S. Provisional Patent Application Ser. No. 62/591,756, filed on Nov. 28, 2017, which is hereby incorporated by reference herein in its entirety.

BACKGROUND

The Internet has had a democratizing effect on the dissemination of information, giving everyday users the ability to generate, curate, and publish content for distribution to mass audiences traditionally accessible only to large and well-established media conglomerates (e.g., publishing houses, newspapers, magazines, and other print media companies; local, cable, and satellite radio and television stations and other broadcast media companies; film and music studios, video game publishers, and other media entertainment companies; etc.). Today, an individual can share personally authored or curated content to a website, desktop or mobile application, or other content management software and potentially reach out to numbers of people previously only available to conventional mass media companies. While the proliferation and widespread distribution of content has generally been a boon for users, these developments have also introduced problems with navigating the abundance of content and discovering new content that may be relevant to users.

BRIEF DESCRIPTION OF THE DRAWINGS

The present disclosure will describe various embodiments with reference to the drawings, in which:

FIGS. 1A-1F illustrate examples of graphical user interfaces for a client application including content discovery functionality in accordance with an embodiment;

FIGS. 2A-2F illustrate examples of graphical user interfaces for a client application including a continuously refreshed content discovery feed in accordance with an embodiment;

DETAILED DESCRIPTION

Figure 1D:
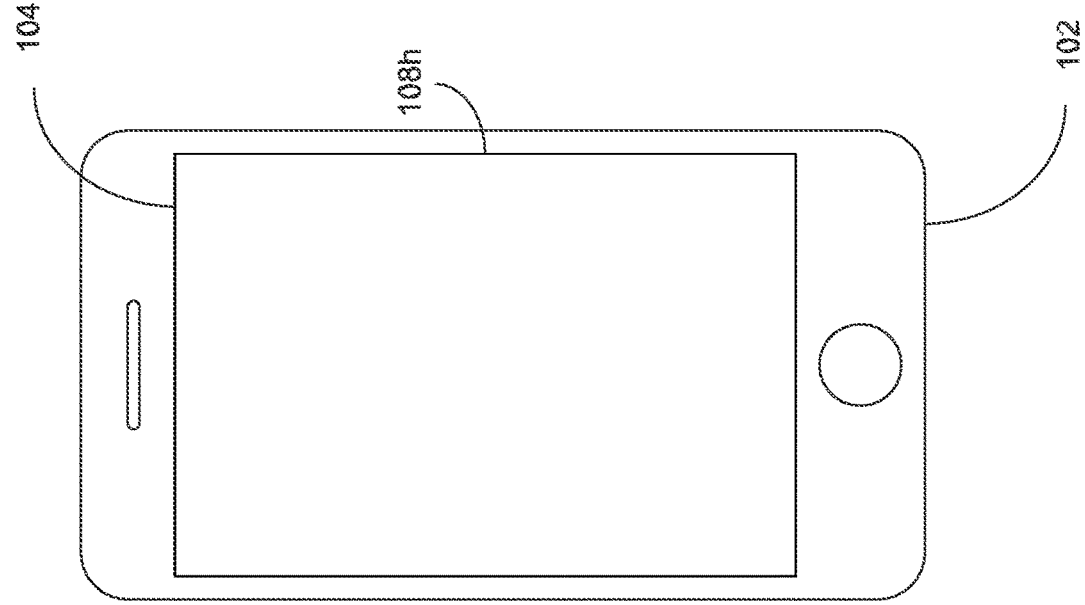

Systems and methods in accordance with various embodiments of the present disclosure describe approaches for navigating content and discovering new content. Content can include text, images, audio clips, video clips, or other multimedia clips captured by an electronic device, as well as their associated metadata. The metadata can be generated by an electronic device capturing the text, image, audio, video, or other multimedia data. The metadata can also be associated with content later by other devices.

A set of content items that are related can form a story (e.g. a content collection), and a story can be represented graphically by a story cover (e.g., also referred to in the present disclosure as a tile) comprising, text, image, video, or other multimedia data. A tile is an interactive user interface element. Upon detecting a user interaction with a tile, the client device displays content associated to the tile. A story can include multiple sub-stories with each sub-story associated with its own cover. The overall story can be represented by one of its sub-stories' covers (e.g., the cover of the most recent sub-story, the most relevant sub-story, the sub-story related to the most proximate geographic location, the most popular sub-story, etc.).

In various embodiments, a computing system can receive content from client devices (e.g., desktops, laptops, tablets, smart phones, etc.), and analyze the content to determine its author or curator, associated geographic location, date and time, and other related details. In some cases, the system can also process the content to extract additional characteristics of the content, such as relevant keywords from text using text retrieval techniques; the identities of persons or objects in image, video, and other multimedia data using machine vision; the relationship of the author or curator to a particular user via social graphing; and other quality metrics of the content.

In some embodiments, the computing system can include content management functionality to enable users (e.g., consumers, advertisers, content producers, etc.) to edit and create their own content to share with others. The computing system can also automatically generate stories based on system trends and the characteristics of content, such as whether the content was created within a certain geographic location (e.g., within a particular geofence); how recently the content was created; the quality of the text, image, audio, video, or other multimedia of the content; and how similar the content is to other content (e.g., content including the same or similar keywords; content including the same or similar persons or objects; content having the same or similar levels of popularity; etc.); among other factors. The computing system may also include search functionality for locating stories based on keywords in a text query, content of an image-based query, geographic proximity to a location-based query, and the like.

The computing system can assign stories to one or more user segments, such as segments based on demographics (e.g., age, gender, level of education, etc.); user location; user interest (e.g., common affinity for sporting events, music, weather, pets, etc.); and other user characteristics. In some embodiments, the user segment for a story may be adjusted over time based on system trends associated with the characteristics of content (e.g., a spike in activity from a baseline or average for a location, or other characteristic indicating a newsworthy event). Similarly, the system may utilize these trends to generate new stories having associated content. A client device can receive access to stories that correspond to the device's user segment (e.g., a device's location or an interest group associated with the user of the device). This can result in a user receiving stories focused on high-quality recent content items that are generated close to a user. Stories that are older or generated from content taken further away from a user's current location may be provided to a user based on identified trends. Various different metrics or different combinations of metrics may be used to select the stories available for presentation on a particular client device.

When a user accesses a story including a sub-story on the user's client device, the user can select a particular sub-story of the story. The selection is communicated to the system, and the system can provide the device with the selected sub-story. This process can continue with the user selecting another sub-story, with a responsive sub-story being sent to the user's client device. A provided user interface allows a user to navigate back to any earlier viewed sub-story, and to continue viewing additional content items from the earlier sub-story. At any point another sub-story can be selected, resulting in display of the selected sub-story.

In some embodiments, anonymous information about story viewing, selection of content items within an individual story, and screenshotting of content on a client device is fed back to the system to influence the system trends that impact how stories are assigned to user segments. This feedback mechanism can also be integrated with the system trends associated with incoming content items mentioned above to influence the selection of content items for future story generation (e.g., when a story is generated or not generated).

In some embodiments, system trends may be used to adjust assigned user segments for a story based on geographic tiers. In one such embodiment, a global tier can be the top tier of the system, encompassing the entire world. Below the global tier may be a country tier, with the country tier divided into a geographic area for each country participating in the system. Below the country tier is the state tier, then a city tier, then a local tier, etc. When a story is generated by such a system, it is automatically assigned to a user segment for a local geographic area associated with the location where the content was generated. In other words, the story is initially available only to devices within the area where the content items were generated. Based on the system trends, a story can be assigned or "moved up" the tiers to a higher tier area, so that the story is visible beyond the local geographic area where the content for the story was generated. At the highest global tier, a story may be visible to all devices in a system, or may be visible to the broadest user segment possible for a particular story. As a system identifies increasing interest in a story, the story can be pushed up to higher and higher geographic tiers. As the system identifies decreasing interest in the category, the story will similarly be pushed down to lower geographic tiers.

As the system receives new content associated with a story, they may be added to a story, or used to update or replace some previously received content items in a story.

In a system that operates with geographic tiers, the number and type of stories for different users in different geographic areas can have a different mix of stories presented for selection in a user interface of an application operating on a device. One set of stories made available to a first client device in a first local area could include all local stories. Another set of stories available in a different local area could include eight local stories, four city stories, one state story, no country stories, and two global stories. In certain embodiments this mix of geographic representation in the stories available on a single device change over time and for different user segments in different local areas based on the particular characteristics of the content items available to a system. Other embodiments may not use fixed geographic tiers, but may assign an area to a story based on content characteristics or metadata associated with content in a story. For example, in certain embodiments a set of content for a story may all occur within a 10 meter radius, and the system may determine that the story will only be of interest to users that are very close to this location. Rather than making the story available to all users within a larger geographic area, the system may automatically assign an area to the story, and may make the story available only to users in the area that was generated and assigned for that story.

FIGS. 1A-1F show examples of graphical user interfaces for a client application executing on client device 102 and displayed on touchscreen 104. These graphical user interfaces are but one example of a set of user interfaces for a client application including content discovery functionality, and other embodiments may include fewer or more elements. However, the present disclosure is generally applicable to any application for presenting personal content for sharing with select friends and family alongside professionally produced content targeted at mass audiences, such as social media and social networking; photo, video, and other multimedia sharing; web logging (blogging); news aggregators; CMS platforms; and the like.

FIG. 1A shows an example of an initial state of the content discovery functionality (e.g., a content discovery feed) of a client application, which may be presented in response to an input to client device 102 associated with selecting a content discovery feed (e.g., a lateral swipe gesture on touchscreen 104, a selection of a virtual button displayed on touchscreen 104, a voice command requesting the feed, etc.). The initial state of the content discovery feed includes banner 106 and a menu. The menu includes a plurality of tiles 108a, 108b, 108c, and 108d (collectively, 108). The plurality of tiles may be displayed in two columns of tiles 108. In particular, FIG. 1A shows all of the content for tiles 108a and 108b and occludes portions of the content for tiles 108c and 108d. Each tile represents a story that, upon selection by a user, displays the story in a full-screen mode within the client application as discussed further with respect to FIGS. 1D-1F and elsewhere in the present disclosure. Tiles can include text, audio, video, and other multimedia data. In some embodiments, tiles including video will automatically play in-line. In some embodiments, video tills will play on mute. In some embodiments, video tiles are spaced apart by a specified number of non-video tiles (e.g., at least 3 non-video tiles). In some embodiments, the specified number of non-video tiles can be random so that video tiles may be displayed in both columns. In some embodiments, video tiles are streamed from a content streaming server. In some embodiments, the client application may utilize placeholder thumbnails for the first frame of the video tiles.

In some embodiments, the client application updates the tiles during story viewing as the user progresses from content item to content item. In addition, or alternatively, tiles may be updated upon a remote re-order as discussed elsewhere in the present disclosure.

In the example of FIG. 1A, the tiles have the same width while the height of each tile can depend on the aspect ratio of the image, video, or other multimedia data graphically representing the stories associated with the tiles. This can result in the variability of tile heights because the devices used to capture and/or edit image, video, and other multimedia data oftentimes use different dimensions for capturing/editing this data. The variability in tile heights creates an offset between the tile columns that can help users more easily differentiate between tiles. In some embodiments, each tile must have a minimum height relative to the width (e.g., half of the width of the tile). If the aspect ratio of the width to the height of the tile is greater than the minimum aspect ratio (e.g., greater than 2:1), the height of the tile can be set to equal the minimum and the tile can be aspect filled.

In some embodiments, to further ensure offsetting tile columns, a predetermined number of tiles (e.g., 4 tiles) in one column can be artificially cropped by an absolute value (e.g., 10 pixels) or a relative value (e.g., 10%). The client application can select the column having the cropped tiles at random each time the tiles are refreshed, as discussed further with respect to FIGS. 2A-2F and elsewhere in the present disclosure. In this example, FIG. 1B shows an example of a state of the content discovery feed of the client application, subsequent to the state of FIG. 1A, after client device 102 receives a navigational input (e.g., a vertical swipe gesture on touchscreen 104, a selection of a virtual up/down button displayed on touchscreen 104, a voice command requesting for more content, etc.). In this example, the navigational input causes the client application to scroll down the content discovery feed to fully occlude the content of tile 108a; partially occlude the content of tile 108b; fully display the content of tiles 108c and 108d; and display a portion of the content of tile 108f.

FIG. 1C shows an example of another state of the content discovery feed of the client application, subsequent to the state of FIG. 1B, after client device 102 receives a similar or the same navigational input as in FIG. 1B. In this example, the navigational input causes the client application to scroll further down the content discovery feed to fully occlude the content of tiles 108b and 108c; partially occlude the content of tile 108d; fully display the content of tiles 108f and 108g; and display a portion of the content of tile 108h. In various embodiments, a user can continuously scroll the content discovery feed to give the user an impression that the user has access to an unlimited feed of relevant content.

Figure 1E:
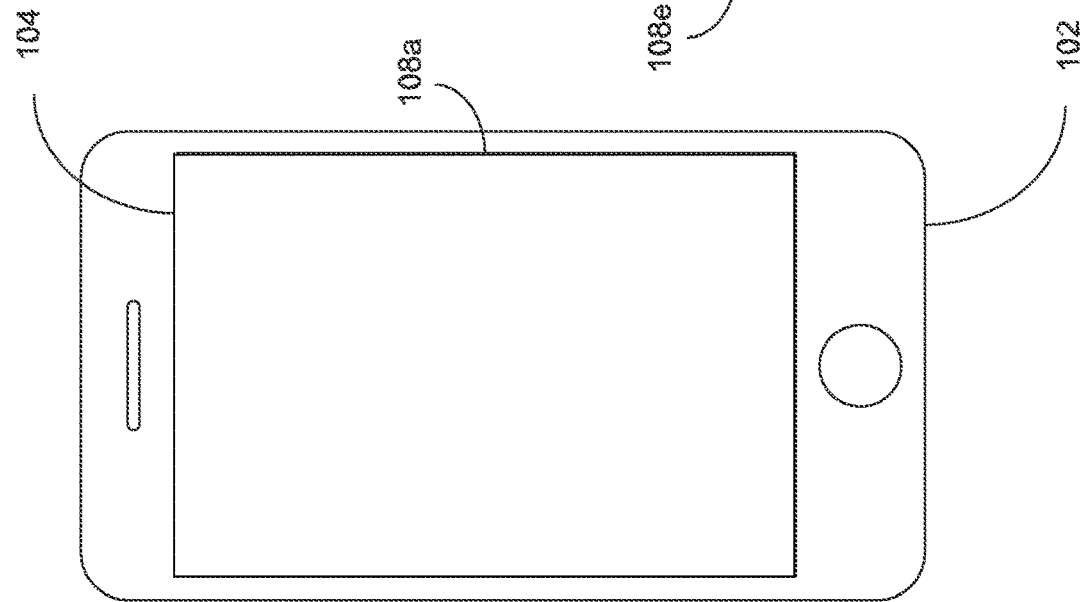
Figure 1F:
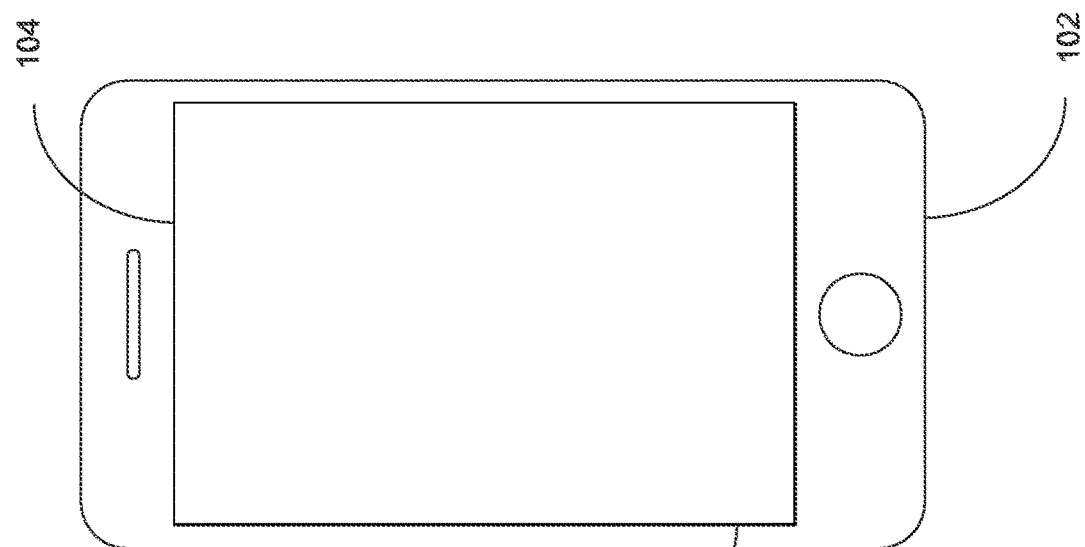

FIGS. 1D-1F show examples of stories supported by the client application, including a user story in FIG. 1D, a publisher story in FIG. 1E, and a map story in FIG. 1F corresponding to tiles 108h, 108a, and 108e, respectively. User stories can be private (e.g., only shared with a select number of other users) or public (e.g., accessible to any user of the system). User stories can be designated as official stories when associated with verified public figures and celebrities. Official stories can be graphically represented by unique icons, such as emoji (e.g., also referred to as emotional icons or emoticons), BITMOJI®, logos, etc. In some embodiments, the verified users of official stories can also receive additional privileges not available to non-official users/accounts, such as the ability to grant privileges to other users (e.g., collaborators) to edit and create content for the official story. Official stories can also be given greater weight when the system attempts to rank stories in the content discovery feed. User stories can also be designated as popular when associated with popular user accounts, such as stories that consistently receive a specified number of impressions over a lengthy period of time. The client application can support numerous other types of stories, such as publisher stories, promoted stories, group stories, generated search stories, generated map stories, and geo stories, among others. Stories can also be associated with certain characteristics.

Table 1 sets forth examples that can be supported by a client application including support for content discovery functionality.

TABLE 1

Story Types

| Story Type | Expiration | Graphical Representation | Title | Secondary Text | Time Stamp |
| --- | --- | --- | --- | --- | --- |
| Official Story | 24 hours | Verified User's Emoji | Yes (display name) | Yes ("Official") | Yes |
| Popular User Story | 24 hours | User's BITMOJI® | Yes (display name) | Yes ("Popular") | Yes |
| Public User Story | 24 hours | User's BITMOJI® | Yes (display name) | Yes ("Public") | Yes |
| Publisher Story | N/A | Publisher Logo | Optional (headline) | N/A | Yes |
| Promoted Story | Var. | Brand Logo | Yes (headline) | N/A | No |
| Group Story | | Customizable | Optional (headline) | N/A | Yes |
| Partnered/Sold | 36 hours | | | | |
| Partnered/Unsold | 36 hours | | | | |
| Unpartnered/Sold | 30 days | | | | |
| Unpartnered/Unsold | 30 days | | | | |
| Generated Search Stories | Var. | Globe | Yes (story name) | Yes (location if available) | Yes |
| Generated Map Story | 30 days | Globe | Yes (story name) | Yes (location if available) | Yes |
| Map Tile | Var. | Location Pin Emoji | Optional (story name) | Yes (name of posters) | No |

TABLE 1-continued

Story Types

| Story Type | Expiration | Graphical Representation | Title | Secondary Text | Time Stamp |
| --- | --- | --- | --- | --- | --- |
| Geo Story | 24 hours | Location pin icon | Yes (story name) | Yes (name of posters) | Yes |

Figures 2A, 2B, 2C:
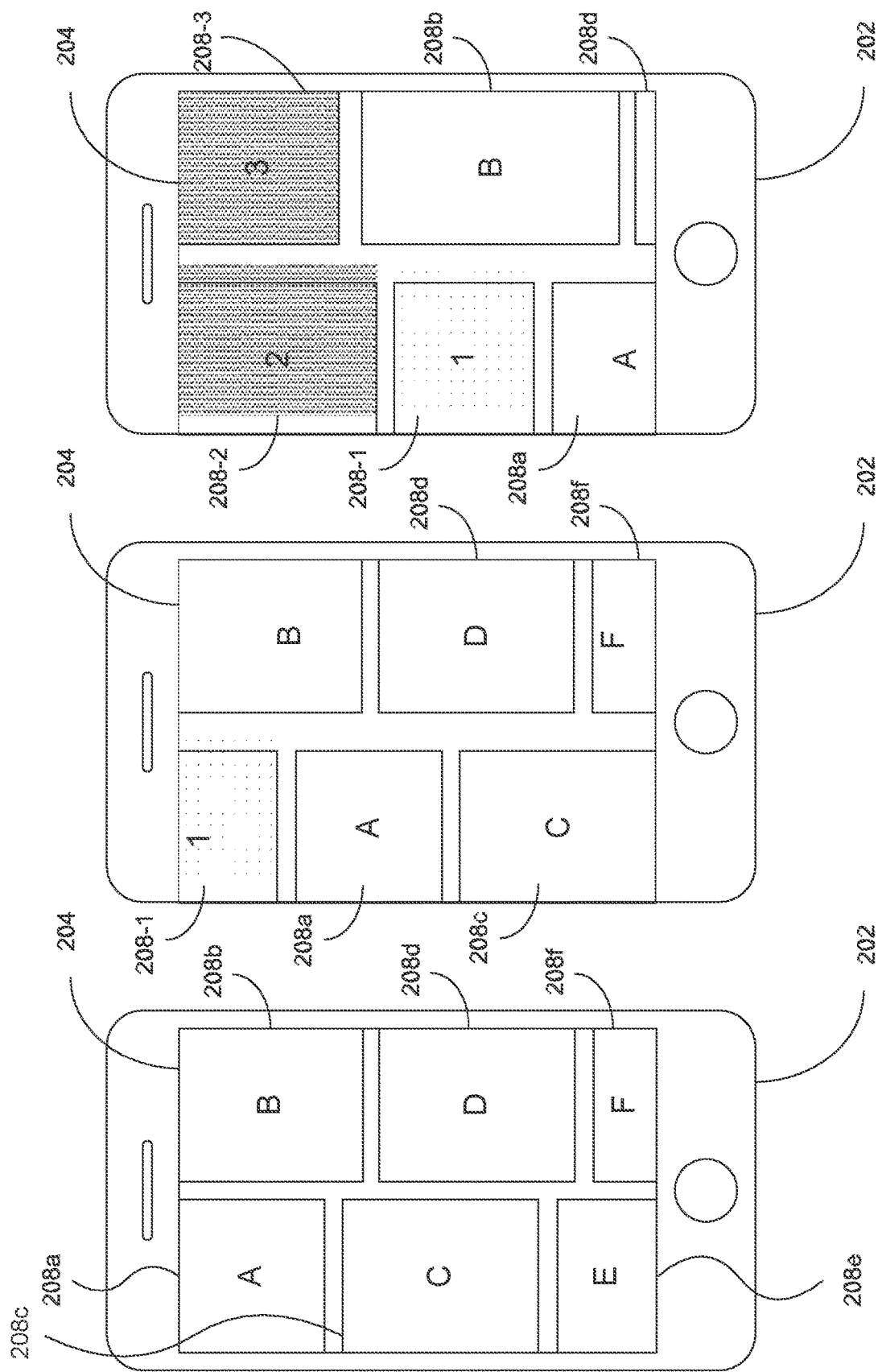

FIGS. 2A-2F show examples of graphical user interfaces for a client application executing on client device 202 and displayed on touchscreen 204 and that is similar or the same to the client application of FIGS. 1A-1F. In particular, FIGS. 2A-2F illustrate approaches on how the client application refreshes a content discovery feed. Here, FIG. 2A shows an example of an initial state of the content discovery feed including initial tiles 208a, 208b, 208c, 208d, 208e, and 208f (collectively, 208).

FIGS. 2B, 2C, and 2D show examples of states of the content discovery feed, subsequent to the state of FIG. 2A, after client device 202 respectively receives 1 new story (e.g., corresponding to tile 208-1), 3 new stories (e.g., corresponding to tiles 208-1, 208-2, and 208-3), and 6 new stories (e.g., corresponding to tiles 208-1, 208-2, 208-3, 208-4, 208-5, and 208-6). As shown, the client application inserts tiles 208 from the top and left, right, left, right, and so on. In some embodiments, the client application can animate the insertion of tiles associated with new stories such that a tile column flows vertically to concurrently display a portion of a new tile and occlude a corresponding amount of a bottom tile until the new tile is fully displayed.

In some embodiments, to ensure offsetting tile columns, a specified number of tiles (e.g., 4 tiles) inserted onto the top of the shorter column are cropped by an absolute value (e.g., 10 pixels) or a relative value (e.g., 10%), and the previous top tiles are uncropped. For example, if 1 tile is inserted into the cropped column, that tile is cropped by 10% and the fifth tile in that column is uncropped. Similarly, if 4 tiles are inserted into the content discovery feed, the two tiles inserted in the cropped column are cropped by 10% and the $5^{th}$ and $6^{th}$ tiles in that column are uncropped.

If certain tiles have expired after the client application re-orders the content discovery feed and the tiles are no longer valid, those tiles are removed from the content discovery feed after they are pushed offscreen. If a tile expires when it is still available onscreen during the time period the client application re-orders the content discovery feed, the client application can animate the removal of that tile before re-ordering the content discovery feed. For example, FIG. 2E shows an example of a state of the content discovery feed, subsequent to the state of FIG. 2A, in which the story associated with tile 208d expires and is removed from the content discovery feed. The content discovery feed then pushes tiles 208f and 208g up to replace tile 208d.

In some cases, one story can expire while a user views a part of another story (but does not complete viewing the story). The client application will remove the expired story and may re-order the viewed story if it is less relevant and/or less recent than other stories. For example, FIG. 2F shows an example of a state of the content discovery feed, subsequent to the state of FIG. 2A, in which a user has partially viewed the story associated with tile 108a and the story associated with tile 208b expires. The client application removes the story associated with tile 208b, and concurrently re-orders the stories associated with tiles 108a and 108c and inserts the new stories associated with tiles 208-1 and 208-2.

In some embodiments, a client application can support navigation and discovery of unread sub-stories in a content discovery feed even when a user views another sub-story of the story (e.g., the user partially views the story). Each sub-story may be associated with its own tile, and selection of a tile of a particular sub-story will open that sub-story even when the story may include unread sub-stories that are ranked higher than the selected sub-story (e.g., the unread sub-story may be determined to be more relevant, the unread sub-story may have been created more recently, the unread sub-story may be associated with a location more proximate to the current location of the user, etc.). By updating the tile for the story to the tile of an unread sub-story, a user may be more likely to re-enter the story to view a different aspect of the story.

An example of a graphical user interface for a content discovery feed (also referred to in the present disclosure as a Stories Screen) can include the following elements.

In some embodiments, the content associated to a tile is downloaded and stored in cache before the tile is displayed in the content discovery feed. While the content is being loaded at the client device, a Loading Stories Screen may be displayed on the user interface of the client device. The Loading Stories Screen may be a blank page with a loading spinner in the center. If the client device fails to load the content, an error message may be displayed on the user interface of the client device. For example, the error message may include one of the following messages: No Internet: "No Internet connection"; Host Not Reachable: "Please check your connection and try again." Dropdown; Other (User Initiated): "Could not refresh. Please try again."; Other (System Initiated): "Could not refresh.". In some embodiments, the client application will automatically retry to upload the content after an interval of time (e.g., a few seconds), optimally backing off exponentially. The client device may also display an interactive element that, when activated by a user, triggers a tentative to upload the content. When the contents associated to all the tiles to be displayed have been successfully loaded, the tiles may be displayed on the user interface of the client device all at once. For example, the tiles may fade in over a preset period of time (e.g., 0.3 seconds).

In some embodiments, the content is streamed and there will be no pre-caching of content. The tiles are displayed in the content discovery feed as soon as they are available. There may be no visible indication that the content is loading. In particular, if new content is being downloaded during a Remote Re-Order (e.g., according to a process for refreshing a content discovery feed described in relation to FIG. 4), there may be no visible indication that new content is loading. If the client device fails to load the list of content, an error message may be displayed on the user interface of the client device. If the content loads in under a threshold duration of time (e.g., the Re-Order Animation Threshold)

and the client device did not detect any user interaction with the content discovery feed during the loading time (e.g., scrolling or tapping), the client device displays the tiles. If the content loads in over the threshold duration of time (e.g., Re-Order Animation Threshold) or the client device detected any user interaction with the content discovery feed during the loading time, the client device displays an interactive user interface element (e.g., a dropdown button "New Stories") alongside an indication that new content is available for viewing. The display of the interactive user interface element may start a timer to track the time the user interface element is being displayed. Upon detecting an interaction with the interactive user interface element, the client device performs a refresh of the content discovery feed (e.g., according to operations 412-414 of the process for refreshing a content discovery feed described in relation to FIG. 4). The interactive user interface element remains on screen for at least a preset duration of time (e.g., "More Stories Button Screentime Min Threshold") but disappears if the client device detects a user interaction or after the preset duration of time (e.g., "More Stories Button Screentime Threshold"). If the client device detects a user interaction with one of the displayed tile, the client device displays the content associated to the tile. When the display is over or interrupted by the user, the client device displays the content discovery feed including the interactive user interface element (e.g., the dropdown button "New Stories") and restarts the timer.

While loading an image to be displayed as a tile, the client device can display a temporary image where the tile should be displayed (for example a tile of color). The color can be a pre-defined color, or the dominant color in the tile. When the tile if loaded, the client device displays the tile over the temporary image. While loading a video to be displayed as the tile, the client device can display a temporary image (e.g., a thumbnail image for the video, or a tile of color). When the video is loaded, the client device can display the video in place of the temporary image.

The graphical user interface can be supported by the following logic. In some embodiments, after a user views a story, the tile associated to the story remains in the same position in the content discovery feed. If a user views a part of a story but doesn't complete the story, the story can remain in the content discovery feed. In some embodiments, when there is an updated tile for certain stories (e.g., story including sub-stories), the client application may display the updated tile upon the user exiting the story. If there is no updated tile, the client application will display the originally selected tile. In other embodiments, the client application may display an updated tile that is the highest ranked content item that the user has not yet seen in the story. Additional details regarding stories including sub-stories are discussed further below with respect to FIGS. 3A-3D and elsewhere in the present disclosure. Additional details regarding stories with no sub-stories are discussed in further detail elsewhere in the present disclosure. If the client device detects a user interaction with the user interface, the user interaction being associated to an instruction to refresh the content discovery feed, like for example, a touchscreen gesture on the user interface (e.g., a Pull to Refresh), the client device performs a process for refreshing a content discovery feed (e.g., the process described in relation to FIG. 4 or 5). After the client device performs the process for refreshing a content discovery feed, the new or re-ordered tiles are inserted at the top of the content discovery feed. Additional details regarding loading animation are discussed with respect to FIGS. 3A-3F.

When the client device performs a process for refreshing a content discovery feed, the order of displayed tiles changes and some new tiles may be inserted. The process for refreshing a content discovery feed may be a Local Re-Order or a Remote Re-Order. A Local Re-Order is when the client application uses locally available content (e.g., content the client was already aware of) to re-order the content discovery feed. Examples include tiles that were previously offscreen or a different tile for a partially viewed story or skipped story. In some embodiments, a Local Re-Order will rank stories higher when, based on user interactions, content characteristics, system trends, and the like, there is a likelihood the user will engage with the re-ranked content. In some embodiments, promoted stories can remain within the pre-determined range (e.g., within 1 tile of the original placement of the promoted story).

A Remote Re-Order is when the client application uses newly downloaded info from the server to dictate a re-ordering of tiles. This content can include stories that were created or updated since the user last visited the content discovery feed.

In some embodiments, if there is no new content from the server, the client application may still perform a Local Re-Order. In some embodiments, if the reload request failed, the client application may not perform a Local Re-Order (as this would imply that the client device has a network connection). A Remote Re-Order is also a time when the client application can change the tile which represents a story. Additional details regarding tile selection are discussed elsewhere in the present disclosure.

An Explicit Remote Re-Order is when the user pulls to refresh the content discovery feed. If the client application has a fully loaded tile list, with tile images/videos already displayed, when the user requests for an explicit remote re-order, the client application can apply an extra impression on tiles already recently seen by the user. This can make it more likely that those tiles move further down the content discovery feed when the feed is updated, and in turn, this can give users the impression that the content discovery feed is continuously refreshing. In some embodiments, if there already is an outgoing request or most of the tiles have not loaded their content, the client application may not apply an extra impression on those tiles.

The refresh process may be performed according to the following logic. Upon re-order, there is the opportunity for content to be re-shuffled, old content to be removed, and new content to be inserted. In some embodiments, new tiles are inserted above tiles the user has already viewed. When the client application returns to the content discovery feed over the No Re-Order Threshold but under the Local Re-Order Threshold, the feed may perform a Local Re-order. When the client application returns to the content discovery feed over the Local Re-Order Threshold, the feed may perform a Remote Re-order. Additional details regarding Local Re-Order and Remote Re-order are discussed with respect to FIGS. 5-6 and elsewhere in the present disclosure.

The process for refreshing a content discovery feed may be triggered by one of the following triggering events.

The process for refreshing a content discovery feed may be triggered by the opening of the content discovery feed. When the client application returns to the content discovery feed under a No Re-Order Threshold, no changes occur to the tile order. When the client application returns to the content discovery feed over the No Re-Order Threshold but under the Local Re-Order Threshold, the client application may perform a Local Re-order. In some embodiments, if there is no internet connection, the client application may not perform a Local Re-Order because the client application will not be able to load any tile images/videos and instead the client application displays "No Internet connection." When the client application returns to the content discovery feed over the Local Re-Order Threshold, the client application can perform a Remote Re-Load. When the client application returns to the content discovery feed, and the user continuously opens it (e.g., every 30 seconds), the client application can perform a Remote Re-Order if there has not been a Remote Re-Order attempt in over the Force Remote Re-Order Threshold. This can override the above logic.

is relevant to the user, the client application may display another tile previewing a separate content item in that story.

The process for refreshing a content discovery feed may be triggered by continuous publishing. In some embodiments, the client application can update tiles for certain content items and stories (e.g., publisher stories) when the author/curator of such stories adds tiles and content items (e.g., sub-stories) to a story. Additional details regarding stories having sub-stories are discussed with respect to FIGS. 4A-4D and elsewhere in the present disclosure.

Table 2 sets forth examples of the various values for content discovery feed refreshing discussed above.

TABLE 2

Content Discovery Feed Refresh Values

| Name | Description | Example Default Value | Example Range of Values |
|---|---|---|---|
| pir | How long the client application allows cache tiles to be displayed before hiding them and requiring a remote re-order | 8 hr | 1-24 hr |
| No Re-Order Threshold | Threshold at which the client application will not re-order tiles | 1 min | 0-5 min |
| Local Re-Order Threshold | Threshold at which the client application will perform a local re-order. Over this threshold, the client application can perform a remote re-order. | 5 min | 2-10 min |
| Force Remote Re-Order Threshold | Threshold at which point the client application may force a remote re-order, if one has not occurred. | 10 min | 5-30 min |
| Tiles List Size | Number of items returned from server | 100 items | 50-200 items |
| First Page Size | Number of tile images/videos loaded for the first screen of the content discovery feed | 8 tiles | 4-12 tiles |
| Subsequent Page Sizes | Number of tile images/video loaded for subsequent screens of the content discovery feed | 8 tiles | 4-20 tiles |
| Re-Order Animation Threshold | Threshold at which the client application will re-order automatically. Over this threshold, the client application may instead show a button to re-order. | 5 sec | 2-$\infty$ sec |
| More Stories Button Screentime Min Threshold | Minimum time the more stories button should remain on screen | 3 sec | 0-5 sec |
| More Stories Button Screentime Max Threshold | Maximum time the more stories button should remain on screen if the client application detects no user interactivity with the client application | 10 sec | 5-$\infty$ sec |

The process for refreshing a content discovery feed may be triggered by a user instruction (e.g., a "Pull to Refresh" gesture). In particular, when the user explicitly requests for a refresh of the content discovery feed, the client application can perform a Remote Re-Order.

The process for refreshing a content discovery feed may be triggered by the expiration of a tile. In some embodiments, tiles are not shown on the content discovery feed if the user has not seen those tiles within a period of time greater than a preset threshold (e.g., a "Cached Tile Expiration threshold").

The process for refreshing a content discovery feed may be triggered by a re-displaying of the stories. In some embodiments, the client application can support stories having sub-stories and re-display the same such story within the content discovery feed multiple times by previewing different content items within the story as the tile. For example, if there is a story about helicopters, the client application may display a tile that represents the first content item in the story. If the user does not interact with this content item, but the ranking algorithm still thinks this story To illustrate the logic for content discovery feed refreshing, FIGS. 3A-3D show examples of graphical user interfaces for a client application, similar to that of FIGS. 1A-1F and 2A-2F, capable of supporting navigation and discovery of set of content items (e.g., stories) including multiple content items (e.g., sub-stories) in a content discovery feed. A set of content item is an ordered set of content items ordered according to a content item order. The "last content item" mentioned below is not the last content item to have been displayed but the last content item according to the content item order. If a user selects a particular tile, the client application navigates to the content item that relates to the selected tile unless the user has already viewed the content item associated with that tile, in which case, the client application navigates to the last viewed content item. When a story is not displayed on the user interface for the first time, the client device displays the tile associated to the first content item associated to a tile following the last content item that was at least partially displayed on the user interface, unless there is no content item associated to a tile following the last content item that was at least partially displayed on the user interface, in which case, the client device displays the tile associated to the last content item associated to a tile.

Figure 3B:
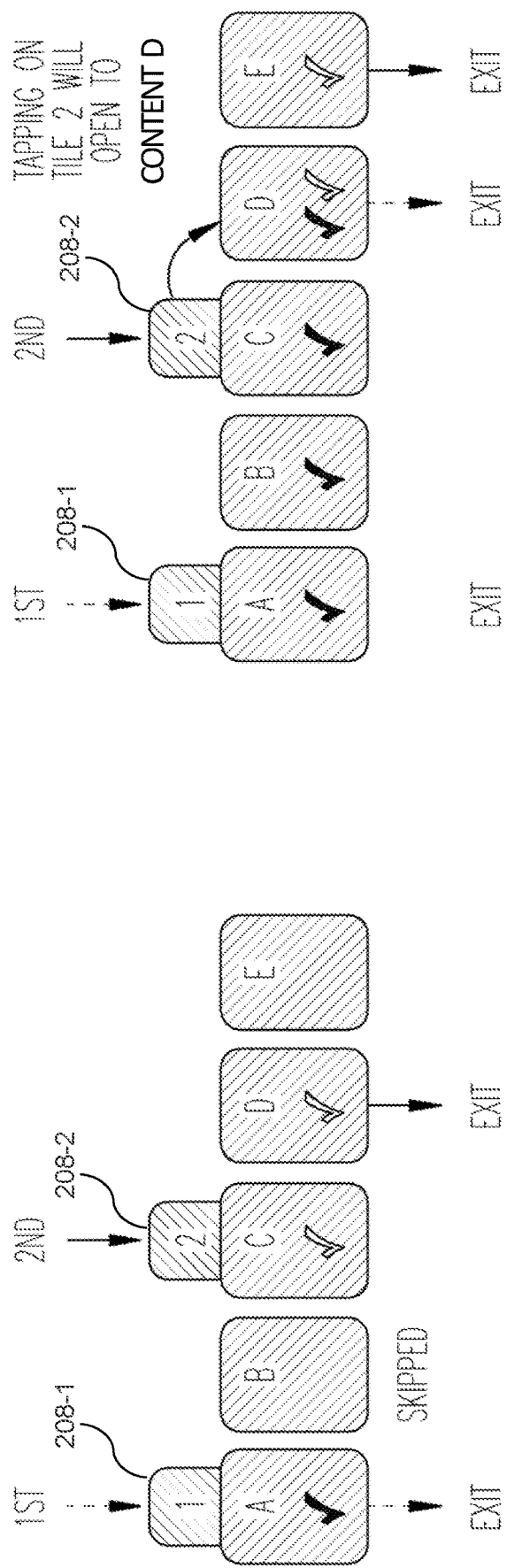
FIGS. 3A-3D illustrate examples of graphical user interfaces for a client application including support for sub-stories in a continuously refreshed content feed in accordance with an embodiment.
Figure 3A:

In the illustrated example of FIGS. 3A and 3B, a story comprises content items A, B, C, D, and E. Content item A is associated to tile 208-1. Content item C is associated to tile 208-2.

In the scenario illustrated by FIG. 3A, the user selects tile 208-1 associated to content item A. The client application displays content item A. The user interrupts the display during content item A. The client application displays tile 208-2 associated to content item C because content item C is the first content item associated to a tile following content item A, content item A being the last content item that was at least partially displayed. When the user opens the story for the second time by selecting tile 208-2 associated to content item C, the client application displays content item C because it is the content item that relates to the selected tile and the content item associated with that tile has not been displayed yet.

In the scenario illustrated by FIG. 3B, the user selects tile 208-1 associated to content item A. The client application displays content item A. The user interrupts the display content item D. The client application displays tile 208-2 associated to content item C because there is no content item associated to a tile following the last content item that was at least partially displayed on the user interface and tile 208-2 is the tile associated to the last content item associated to a tile. However, when the user opens the story for the second time by selecting tile 208-2 associated to content item C, the client device will display content item D because content item C associated with selected tile 208-2 has already been displayed, and content D is the last viewed content item.

Figure 3C:
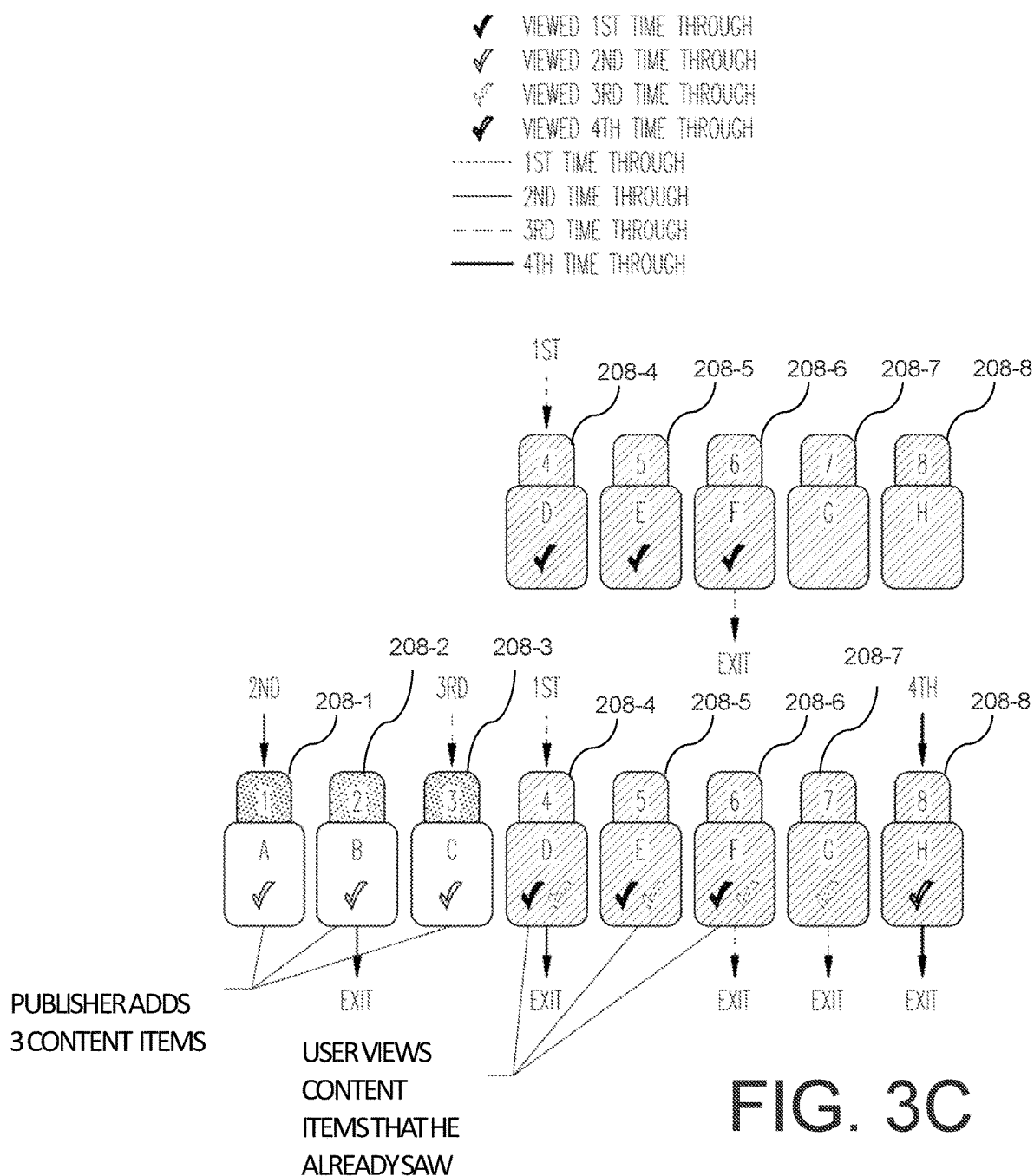

In the example illustrated by FIG. 3C, a story comprises content items D, E, F, G, and H, and all content items have a tile. Tile 208-4 associated to content item D is initially displayed in the content discovery feed. The user selects tile 208-4 associated to content item D. The client application displays content items D, E and F. The user interrupts the display during content item F. After interrupting the display of content item F, the client application displays the discovery feed again, the discovery feed including tile 208-7 associated to content item G. Before the user opens the story for the second time, the story author/curator added content items A, B, C and associated tiles to the content item A, since the first time the story was opened. The tile displayed in the content discovery feed has been updated to tile 208-1 associated with content item A. The user opens the story for the second time by selecting tile 208-1 associated with content item A and exits on content item B. The client application displays tile 208-3 associated to content item C in the story discovery feed because tile 208-3 is the tile associated to the first content item associated to a tile following content item B, content item B being the last content item that was at least partially displayed. When the user opens the story for the third time by selecting tile 208-3 associated with content item C, the client application displays content items C, D, E, F, and G, until the user exits on content item G. The client application displays the discovery feed again, the discovery feed including tile 208-8 associated to content item H, because content item H is the first content item associated to a tile following content item G, content item G being the last content item that was at least partially displayed.

Figure 3D:
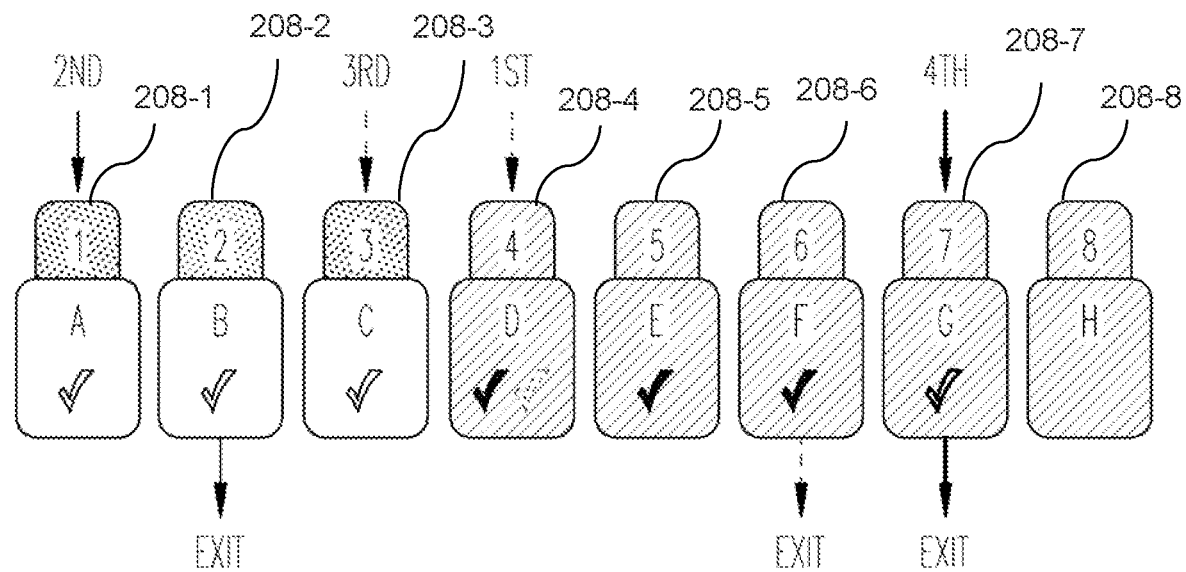

In the example illustrated by FIG. 3D, a story comprises content items D, E, F, G, and H, and all content items have a tile. The user opens the story for the first time by selecting tide 208-4. The client application displays contents D, E and F. After the user interrupts the display on content item F, the client application displays the content discovery feed, the content discovery feed including tile 208-7 for content item G because content item G is the first content item associated to a tile following content item F, content item F being the last content item that was at least partially displayed. Before the user opens the story for the second time, the story author/creator adds content items A, B, and C and associates tiles to content A. Tile 208-7 displayed in the content discovery feed is updated to tile 208-1 associated with content item A. The user opens the story for the second time by selecting tile 208-1 associated with content item A and exits on content item B. The client application displays tile 802-3 associated to content item C in the content discovery feed. The user opens the story for the third time by selecting tile 802-3 associated to content item C. The client application displays content items D, E, and F. After the user exists the display on content item F, the client application displays tile 208-8 associated with content item G, because content item G is the first content item associated to a tile following content item F, content item F being the last content item that was at least partially displayed. When the user opens the story for the fourth time by selecting tile 802-8 associated to content item G, the client application displays content items G.

Figure 4:
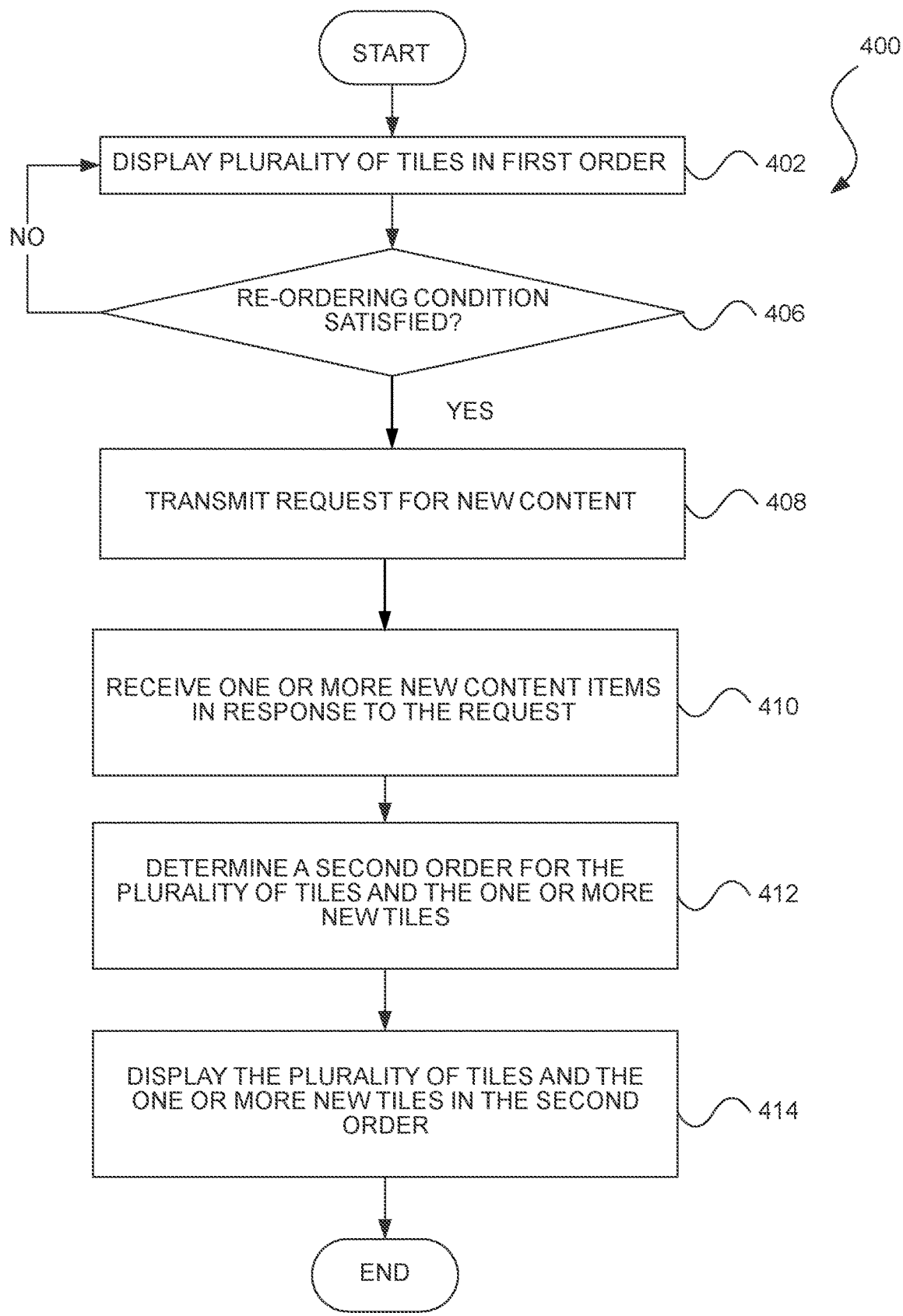
FIG. 4 illustrates an example of a process for refreshing a content discovery feed in accordance with an embodiment.

FIG. 4 shows process 400, an example of a process for refreshing a content discovery feed. A client device (e.g., client device 1300 of FIG. 13), and more particularly, an application (e.g., client application 1234 of FIG. 12) executing on the client device may perform process 400.

At operation 402, the client application displays a plurality of tiles each associated to content of an account of a content sharing network, the plurality of tiles being displayed in a first order. The plurality of tiles can be displayed horizontally offset from one another and in the first order. The first order may be defined based on a set of rules. The set of rules can include on one or more criteria of relevance of a content item represented by a tile to a user of the client device. These criteria can be based on characteristics of the content item, geographic proximity of the content item to the user, user interaction and/or observed trends of the content sharing network, aggregated engagement data of users of the content sharing network with content items. The criteria might also be based on engagement of the user with content items. Engagement might include any kind of interaction with a content item and might be measured with metrics such as a number of view, a sharing rate, a bounce rate, a number of likes, and a number of comments.

At operation 406, the client application determines whether a re-ordering condition for re-ordering the plurality of tiles has been satisfied. The re-ordering condition can include any of the triggering events described elsewhere in the application.

If the re-ordering condition for re-ordering the plurality of tiles has been satisfied, the client application performs a re-ordering (e.g. a "a Remote Re-Order" described elsewhere in the application).

At operation 408, the client device transmits a request to the content sharing network for new content in response to determining that the re-ordering condition has been satisfied. At operation 410, the client device receives one or more new content items in response to the request from the content sharing network. If the story author/creator added content items associated to one of the story associated to one of the tile among the plurality of tile, the added content items may be downloaded at this point. New content items associated to tiles that were not included in the plurality of tile may also be downloaded. The new content items might be selected based on characteristics of the new content items, geographic proximity of the new content items to the user, user interaction and/or observed trends of the content sharing network, engagement of the user with similar content items, and aggregated engagement data of users of the content sharing network with similar content items.

At operation 412, the client device determines a second order for the plurality of tiles and one or more new tiles representing the one or more new content items. The second order may be defined based on the same set of rules used to define the first order. The parameters on which the criteria of the set of rules are based might have changed since the last time the content discovery feed was last displayed, therefore the second order might be difference from the first order. For example, the geographic position of the user and therefore the geographic proximity of a content item to the user might have change. Observed trends of the content sharing network might have changes. In particular, aggregated engagement data of users of the content sharing network with content items might have changes. If the user engaged with content items since the last time the content discovery feed was last displayed (e.g., if the user viewed, shared or liked a story), the engagement data of the user with content items will have changed.

At operation 414, the client device displays the plurality of tiles and the one or more new tiles in the second order. The process iterates operations 402-414, operation 414 corresponding to operation 402 of a new cycle.

Figure 5:
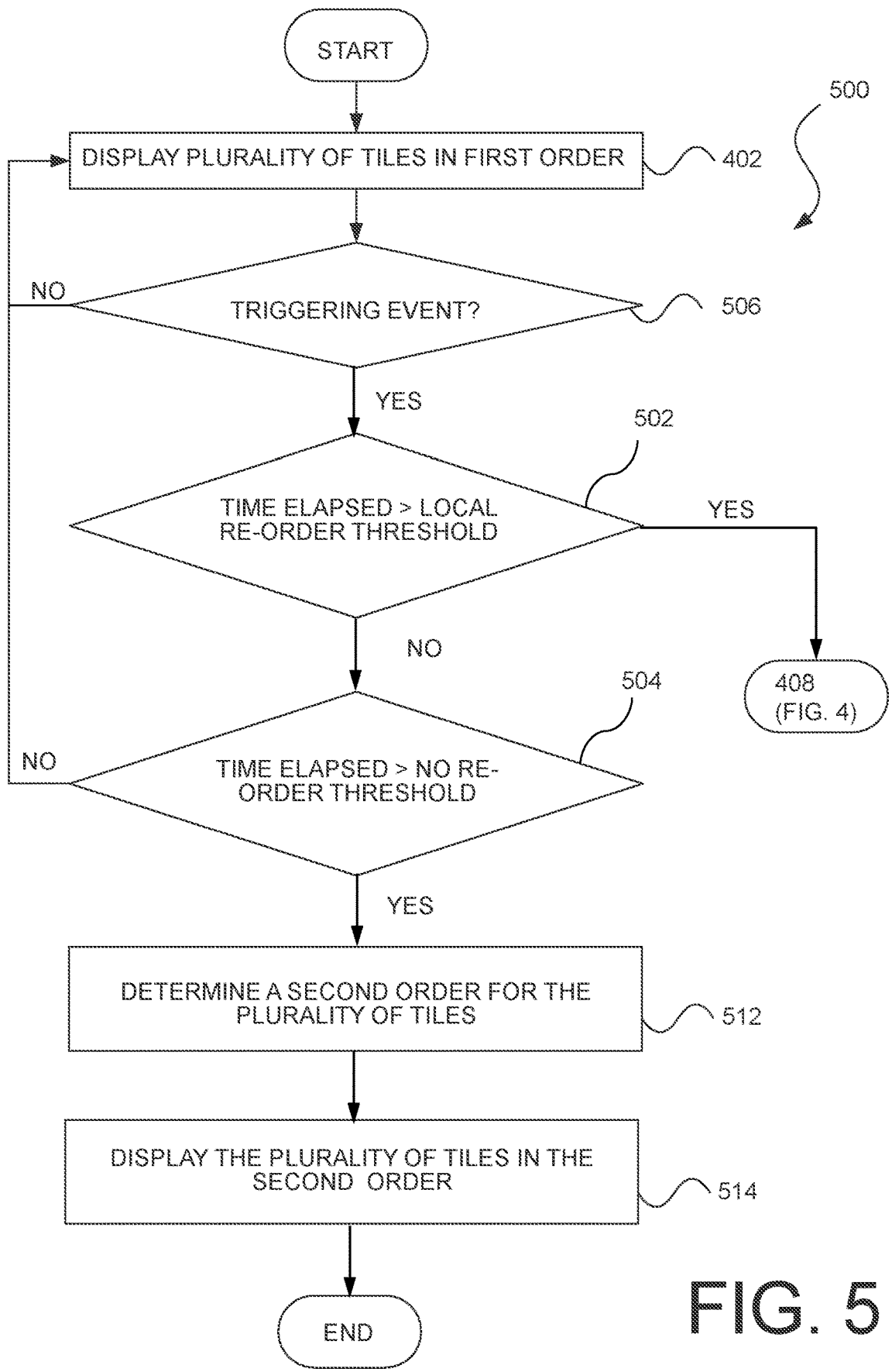
FIG. 5 illustrates an example of a process for refreshing a content discovery feed in accordance with another embodiment.

FIG. 5 shows process 500, another example of a process for refreshing a content discovery feed, that may be performed by a client device (e.g., client device 1300 of FIG. 13), and more particularly, an application (e.g., client application 1234 of FIG. 12) executing on the client device.

At operation 402 (described in relation to FIG. 4), the client device causes display, on a display screen of the client device, of a plurality of tiles in a first order. The client application may start a timer when the plurality of tiles starts being displayed in the first order. The client application might interrupt the timer when the display of the plurality of tiles in the first order is interrupted, for example when the client device is displaying a story, or when the user leaves the content discovery feed page. The client application might alternatively restart the timer when the display of the plurality of tiles in the first order is interrupted, for example when the client device is displaying a story, or when the user leaves the content discovery feed page.

At operation 506, the client application determines whether a triggering event for re-ordering the plurality of tiles has been detected. The triggering event can include one or more of the triggering events described elsewhere in the application.

In response to determining that a triggering event has been detected, the client application determines whether a Local Re-Order or a Remote Re-Order is to be performed. At operation 502, the client device determines whether the time elapsed since the last time the content discovery feed was last displayed surpasses a first threshold (e.g. the "Local Re-Order Threshold"). The time elapsed since the last time the content discovery feed was last displayed can be determined based on the timer.

In response to determining that the time elapsed since the last time the content discovery feed was last displayed surpasses the first threshold, the client device performs operations 408-414 described in relation to FIG. 4 (e.g. a "a Remote Re-Order" described elsewhere in the application). In response to determining that the time elapsed since the last time the content discovery feed was last displayed does not surpass the first threshold, the client application determines, at operation 504, whether the time elapsed since the last time the content discovery feed was last displayed surpasses a second threshold (e.g., the "No Re-Order Threshold").

In response to determining that the time elapsed since the last time the content discovery feed was last displayed surpasses the second threshold, the client application performs a re-ordering (e.g. a "a Local Re-Order" described elsewhere in the application). At operation 512, the client application determines a second order for the plurality of tiles. At operation 514, the client device displays the same plurality of tiles in the second order. The plurality of tiles displayed is unchanged, only the order of the tiles is changed.

Figure 6:
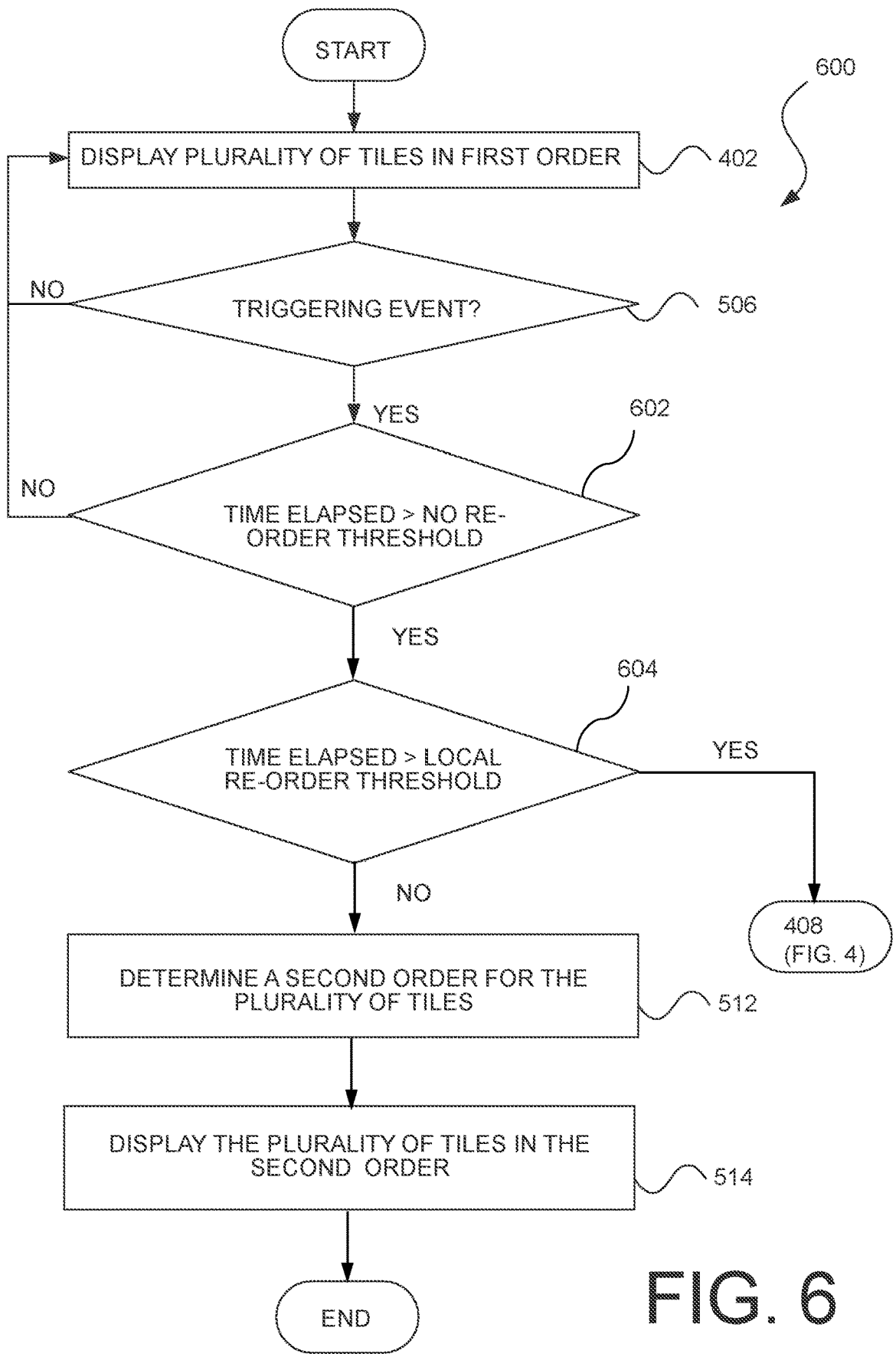
FIG. 6 illustrates an example of a process for refreshing a content discovery feed in accordance with another embodiment.

FIG. 6 shows process 600, another example of a process for refreshing a content discovery feed, that may be performed by a client device (e.g., client device 1300 of FIG. 13), and more particularly, an application (e.g., client application 1234 of FIG. 12) executing on the client device.

At operation 402 (described in relation to FIG. 4), the client device causes display, on a display screen of the client device, of a plurality of tiles in a first order. The client application may start a timer when the plurality of tiles starts being displayed in the first order. The client application might interrupt the timer when the display of the plurality of tiles in the first order is interrupted, for example when the client device is displaying a story, or when the user leaves the content discovery feed page. The client application might alternatively restart the timer when the display of the plurality of tiles in the first order is interrupted, for example when the client device is displaying a story, or when the user leaves the content discovery feed page.

At operation 506, the client application determines whether a triggering event for re-ordering the plurality of tiles has been detected. The triggering event can include one or more of the triggering events described elsewhere in the application.

In response to determining that a triggering event has been detected, the client application determines whether a Local Re-Order or a Remote Re-Order is to be performed. At operation 602, the client device determines whether the time elapsed since the last time the content discovery feed was last displayed surpasses a first threshold (e.g. the "No Re-Order Threshold"). The time elapsed since the last time the content discovery feed was last displayed can be determined based on the timer.

In response to determining that the time elapsed since the last time the content discovery feed was last displayed does not surpass the first threshold, the client device does not perform any reordering and the plurality of tiles remain displayed in the first order.

In response to determining that the time elapsed since the last time the content discovery feed was last displayed surpasses the first threshold, the client device determines, at operation 604, whether the time elapsed since the last time the content discovery feed was last displayed surpasses a second threshold (e.g., the "Local Re-Order Threshold").

In response to determining that the time elapsed since the last time the content discovery feed was last displayed surpasses the second threshold, the client device performs operations 408-414 described in relation to FIG. 4 (e.g. a "a Remote Re-Order" described elsewhere in the application). In response to determining that the time elapsed since the last time the content discovery feed was last displayed does not surpass the second threshold, the client device performs operations 512 and 514 (described in relation to FIG. 5).

The process (e.g., process 400 of FIG. 4, process 500 of FIG. 5, or process 600 of FIG. 6) can further include determining that a story associated with a first tile among the plurality of tiles and the one or more new tiles has been displayed on the display screen. The client device removes the first tile from the plurality of tiles. Alternatively, the first tile may not be removed from the plurality of tiles and instead ranked at the end of the second order. The tiles associated to stories that have been displayed on the display screen, are ranked at the end of the second order from most recent viewed to least recent viewed.

The process (e.g., process 400 of FIG. 4, process 500 of FIG. 5, or process 600 of FIG. 6) can further include determining that a story associated with a first tile among the plurality of tiles and the one or more new tiles has been displayed on the display screen, and removing the first tile from the plurality of tiles.

When a first content associated to a first tile among the plurality of tiles belongs to a set of contents and the set of contents further including a second content associated to a second tile (e.g., the first and second content are sub-stories of a same story), the process (e.g., process 400 of FIG. 4, process 500 of FIG. 5, or process 600 of FIG. 6) can further include determining that the first content has already been displayed on the display screen; and replacing, in the plurality of tiles, the first tile with the second tile. Additional details regarding stories including sub-stories are discussed further below with respect to FIGS. 3A-3D and elsewhere in the present disclosure.

Some embodiments provide an improved user interface. A user interface is inherently limited in terms of screen space. As a result, only a limited number of tiles can be displayed on the content discovery page. Some embodiments improve the efficiency of using a client device with a user interface by bringing together a limited list of tiles related to relevant content, which can be accessed directly from a content discovery page. Displaying selected tiles in the content discovery page allows the user to access the most relevant content without having to score though a long list of irrelevant stories. The speed of a user's navigation can be improved because it saves the user from scrolling to the tile related to the content of interest, opening it up to enable the content of interest to be displayed.

If a tile has been displayed among the first tiles for a while, it is likely that the user saw the tile. If the user saw the tile and yet did not select it to view the related story, it is likely that the user has no interest in the story associated to the particular tile. According to some embodiments, the displayed tiles are reordered so that tiles that were not previously displayed at the top of the content discovery feed are displayed at the top of the content discovery feed. As a result, the user does not have to scroll through multiple tiles to reach a tile of interest. In some embodiments, the tiles are not reordered unless a time elapsed since the last time the content discovery feed was last displayed surpasses a threshold. This prevents tiles from being constantly reordered which would unnecessary use CPU time and render the user interface unhandy because tiles would be difficult to find since they would constantly be moved around.

Figure 7:
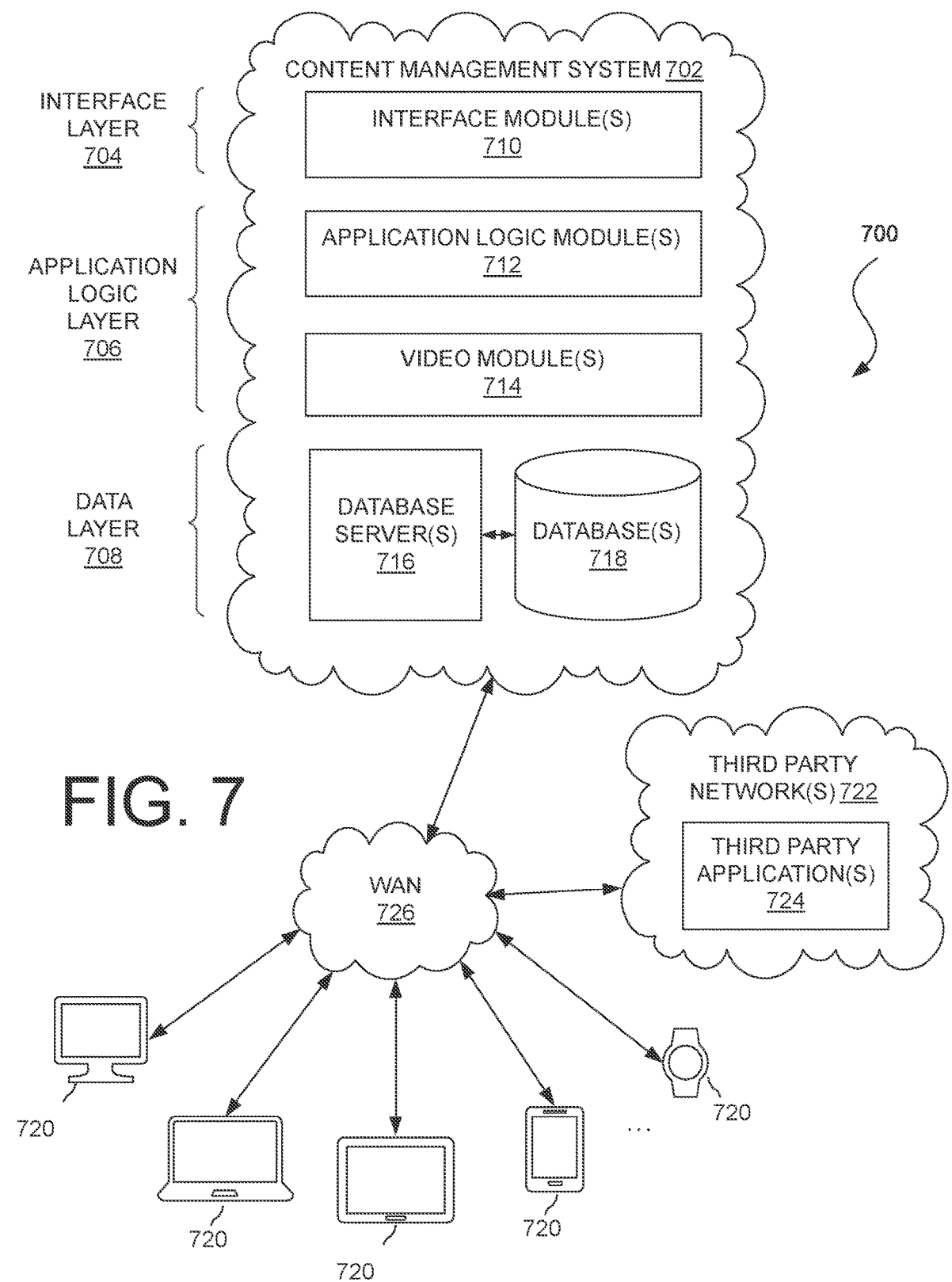
FIG. 7 illustrates an example of a network environment in accordance with an embodiment.

FIG. 7 shows an example of a system, network environment 700, in which various embodiments of the present disclosure may be deployed. For any system or system element discussed herein, there can be additional, fewer, or alternative components arranged in similar or alternative orders, or in parallel, within the scope of the various embodiments unless otherwise stated. Although network environment 700 is a client-server architecture, other embodiments may utilize other network architectures, such as peer-to-peer or distributed network environments.

In this example, network environment 700 includes content management system 702. Content management system 702 may be based on a three-tiered architecture that includes interface layer 704, application logic layer 706, and data layer 708. Each module or component of network environment 700 may represent a set of executable software instructions and the corresponding hardware (e.g., memory and processor) for executing the instructions. To avoid obscuring the subject matter of the present disclosure with unnecessary detail, various functional modules and components that may not be germane to conveying an understanding of the subject matter have been omitted. Of course, additional functional modules and components may be used with content management system 702 to facilitate additional functionality that is not specifically described herein. Further, the various functional modules and components shown in network environment 700 may reside on a single server, or may be distributed across several servers in various arrangements. Moreover, although content management system 702 has a three-tiered architecture, the subject matter of the present disclosure is by no means limited to such an architecture.

Interface layer 704 includes interface modules 710 (e.g., a web interface, a mobile application (app) interface, a restful state transfer (REST) application programming interface (API) or other API, etc.), which can receive requests from various client computing devices and servers, such as client devices 720 executing client applications (not shown) and third-party servers 722 executing third-party applications 724. In response to the received requests, interface modules 710 communicate appropriate responses to requesting devices via wide area network (WAN) 726 (e.g., the Internet). For example, interface modules 710 can receive requests such as HTTP requests, or other Application Programming Interface (API) requests.

Client devices 720 can execute web browsers or apps that have been developed for a specific platform to include any of a wide variety of mobile computing devices and mobile-specific operating systems (e.g., the iOS platform from APPLE® Inc., the ANDROID™ platform from GOOGLE®, Inc., the WINDOWS PHONE® platform from MICROSOFT® Inc., etc.). Client devices 720 can provide functionality to present information to a user and communicate via WAN 726 to exchange information with content management system 702.

In some embodiments, client devices 720 may include a multimedia editing and distribution application that, consistent with some embodiments, allows users to exchange ephemeral messages that include media content, including video messages or text messages. In this example, the multimedia application can incorporate aspects of embodiments described herein. The ephemeral messages may be deleted following a deletion trigger event such as a viewing time or viewing completion. In such embodiments, the device may use the various components described herein within the context of any of generating, sending, receiving, or displaying aspects of an ephemeral message.

Client devices 720 can each comprise at least a display and communication capabilities with WAN 726 to access content management system 702. Client devices 720 may include remote devices, workstations, computers, general purpose computers, Internet appliances, hand-held devices, wireless devices, portable devices, wearable computers, cellular or mobile phones, personal digital assistants (PDAs), smartphones, tablets, ultrabooks, netbooks, laptops, desktops, multi-processor systems, microprocessor-based or programmable consumer electronics, game consoles, set-top boxes, network PCs, mini-computers, and the like.

Data layer 708 includes database servers 716 that can facilitate access to information storage repositories or databases 718. Databases 718 may be storage devices that store data such as member profile data, social graph data (e.g., relationships between members of content management system 702), and other user data and content data, such as spherical video data at varying resolutions, and the like.

Application logic layer 706 includes video modules 714, for supporting various video features discussed herein, and application logic modules 712, which, in conjunction with interface modules 710, can generate various user interfaces with data retrieved from various data sources or data services in data layer 708. Individual application logic modules 712 may be used to implement the functionality associated with various applications, services, and features of content management system 702. For instance, a multimedia editing and distribution application can be implemented using one or more application logic modules 712. The multimedia editing and distribution application can provide a messaging mechanism for users of client devices 720 to send and receive messages that include text and media content such as pictures and video.

Client devices 720 may access and view the messages from the multimedia editing and distribution application for a specified period of time (e.g., limited or unlimited). In an embodiment, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 712.

Figure 8:
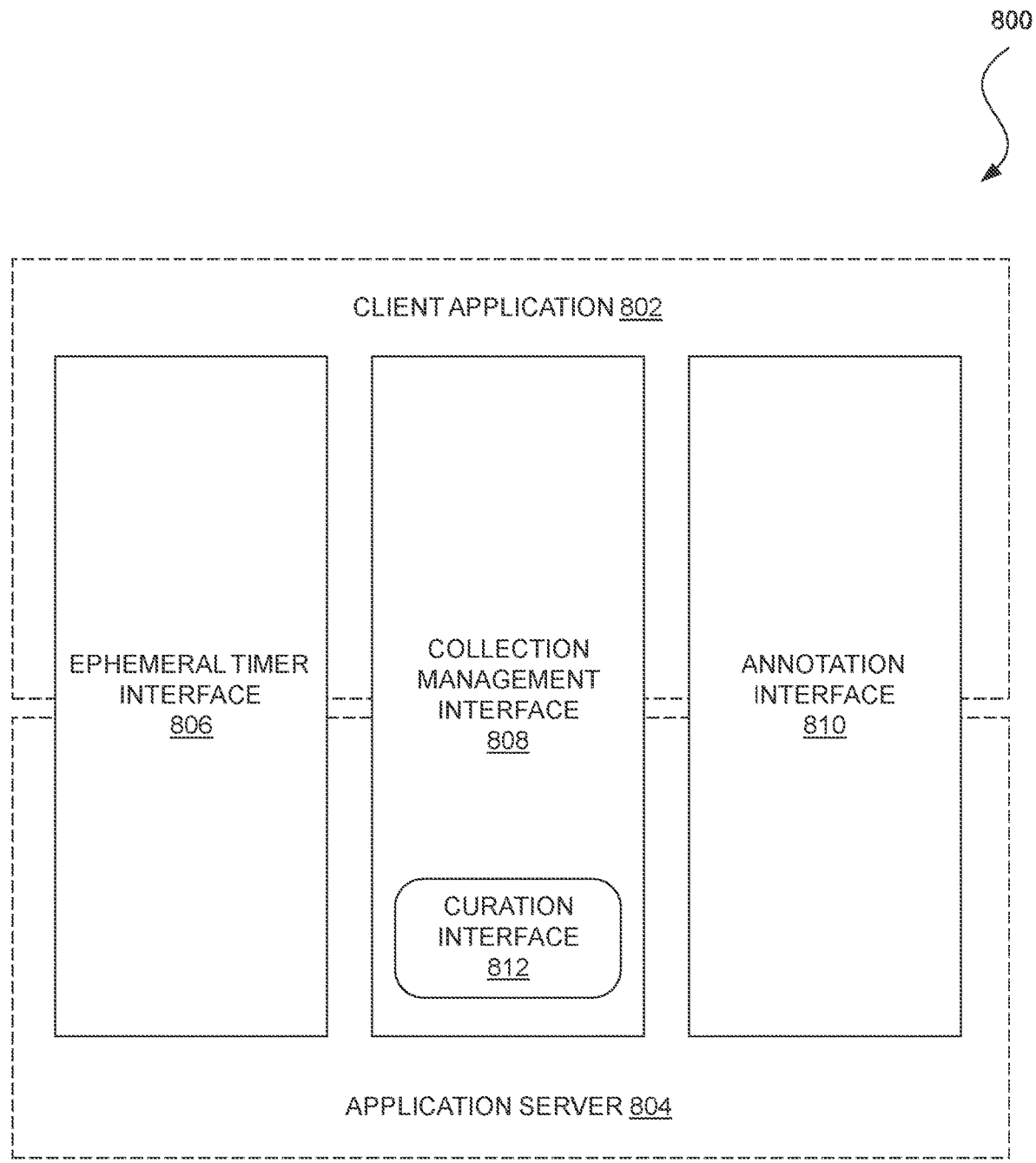
FIG. 8 illustrates an example of a content management system in accordance with an embodiment.

FIG. 8 shows an example of content management system 800 including client application 802 (e.g., running on client devices 820 of FIG. 8) and application server 804 (e.g., an implementation of application logic layer 806). In this example, the operation of content management system 800 encompasses various interactions between client application 802 and application server 804 over ephemeral timer interface 806, collection management interface 808, and annotation interface 810.

Ephemeral timer interface 806 can be a subsystem of content management system 800 responsible for enforcing the temporary access to content permitted by client application 802 and server application 804. To this end, ephemeral timer interface 1014 can incorporate a number of timers that, based on duration and display parameters associated with content, or a collection of content (e.g., messages, videos, a story, a gallery etc.), selectively display and enable access to the content via client application 802. Further details regarding the operation of ephemeral timer interface 806 are provided below.

Collection management interface 808 can be a subsystem of content management system 800 responsible for managing collections of media (e.g., collections of text, images, video, audio, applications, etc.). In some embodiments, a collection of content (e.g., messages, including text, images, video, audio, application, etc.) may be organized into an "event gallery" or an "event story." Such a collection may be made available for a specified time period, such as the duration of an event to which the content relates. For example, content relating to a music concert may be made available as a "story" for the duration of that music concert. Collection management interface 808 may also be responsible for publishing a notification of the existence of a particular collection to the user interface of client application 802.

In this example, collection management interface 808 includes curation interface 812 to allow a collection manager to manage and curate a particular collection of content. For instance, curation interface 812 can enable an event organizer to curate a collection of content relating to a specific event (e.g., delete inappropriate content or redundant messages). Additionally, collection management interface 808 can employ machine vision (or image recognition technology) and content rules to automatically curate a content collection. In certain embodiments, compensation may be paid to a user for inclusion of user generated content into a collection. In such cases, curation interface 812 can automatically make payments to such users for the use of their content.

Annotation interface 810 can be a subsystem of content management system 800 that provides various functions to enable a user to annotate or otherwise modify or edit content. For example, annotation interface 810 may provide functions related to the generation and publishing of media overlays for messages or other content processed by content management system 800. Annotation interface 810 can supply a media overlay (e.g., a filter) to client application 802 based on a geolocation of a client device. As another example, annotation interface 810 may supply a media overlay to client application 802 based on other information, such as, social network information of the user of the client device. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device. For example, the media overlay including text that can be overlaid on top of a photograph generated taken by the client device. In yet another example, the media overlay may include an identification of a location overlay (e.g., Venice beach), a name of a live event, or a name of a merchant overlay (e.g., Beach Coffee House). In another example, annotation interface 810 can use the geolocation of the client device to identify a media overlay that includes the name of a merchant at the geolocation of the client device. The media overlay may include other indicia associated with the merchant. The media overlays may be stored in a database (e.g., database 718 of FIG. 7) and accessed through a database server (e.g., database server 716).

In an embodiment, annotation interface 810 can provide a user-based publication platform that enables users to select a geolocation on a map, and upload content associated with the selected geolocation. The user may also specify circumstances under which a particular media overlay should be offered to other users. Annotation interface 810 can generate a media overlay that includes the uploaded content and associates the uploaded content with the selected geolocation.

Figure 9:
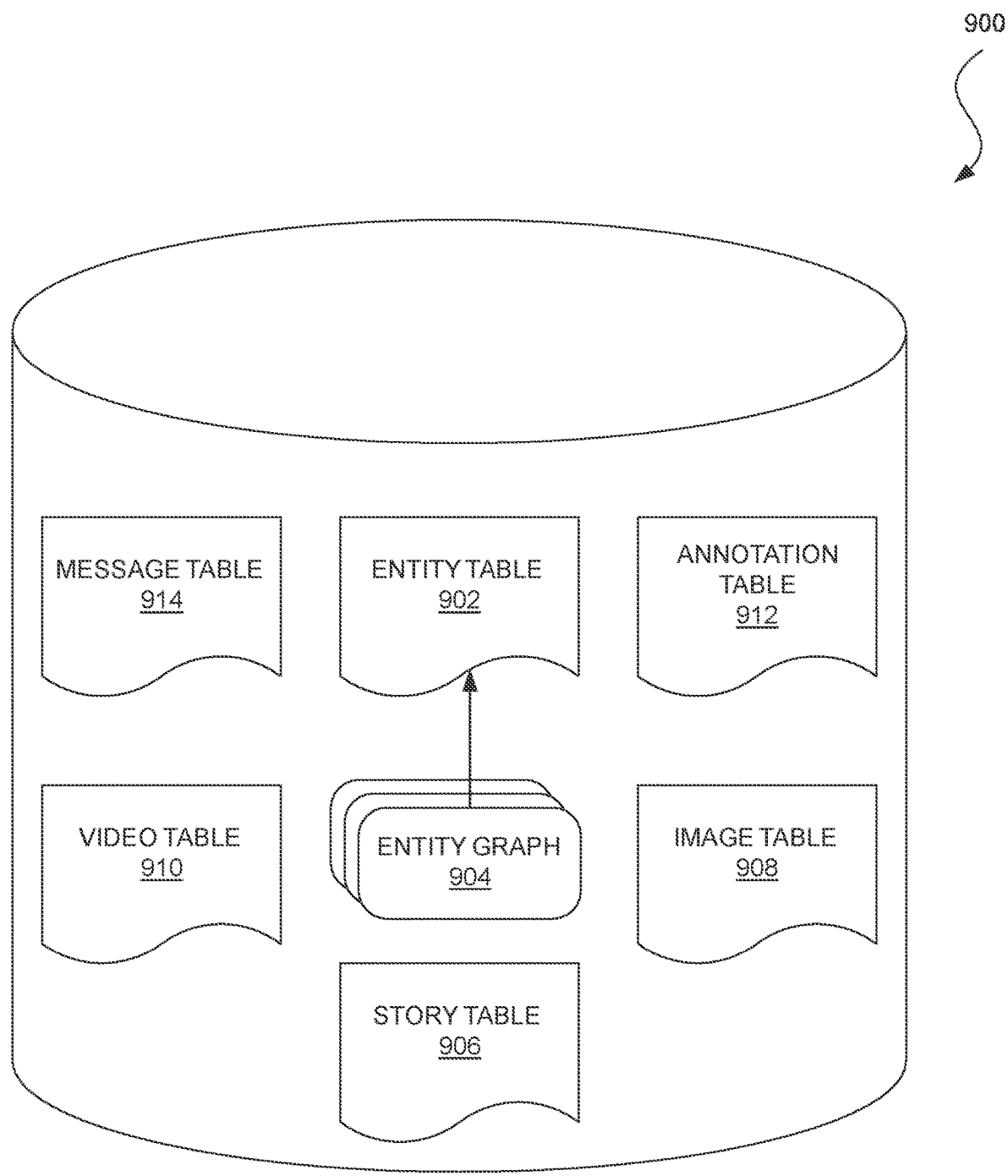
FIG. 9 illustrates an example of a data model for a content management system in accordance with an embodiment.

In another embodiment, annotation interface 810 may provide a merchant-based publication platform that enables merchants to select a particular media overlay associated with a geolocation via a bidding process. For example, annotation interface 810 can associate the media overlay of a highest bidding merchant with a corresponding geolocation for a predefined amount of time FIG. 9 shows an example of data model 900 for a content management system, such as content management system 900. While the content of data model 900 is shown to comprise a number of tables, it will be appreciated that the data could be stored in other types of data structures, such as an object database, a non-relational or "not only" SQL (NoSQL) database, a highly distributed file system (e.g., HADOOP® distributed filed system (HDFS)), etc.

Data model 900 includes message data stored within message table 914. Entity table 902 stores entity data, including entity graphs 904. Entities for which records are maintained within entity table 902 may include individuals, corporate entities, organizations, objects, places, events, etc. Regardless of type, any entity regarding which the content management system 900 stores data may be a recognized entity. Each entity is provided with a unique identifier, as well as an entity type identifier (not shown).

Entity graphs 904 store information regarding relationships and associations between entities. Such relationships may be social, professional (e.g., work at a common corporation or organization), interested-based, activity-based, or based on other characteristics.

Data model 900 also stores annotation data, in the example form of filters, in annotation table 912. Filters for which data is stored within annotation table 912 are associated with and applied to videos (for which data is stored in video table 910) and/or images (for which data is stored in image table 908). Filters, in one example, are overlays that are displayed as overlaid on an image or video during presentation to a recipient user. Filters may be of various types, including user-selected filters from a gallery of filters presented to a sending user by client application 902 when the sending user is composing a message. Other types of filters include geolocation filters (also known as geo-filters) which may be presented to a sending user based on geographic location. For example, geolocation filters specific to a neighborhood or special location may be presented within a user interface by client application 802 of FIG. 8, based on geolocation information determined by a GPS unit of the client device. Another type of filter is a data filter, which may be selectively presented to a sending user by client application 802, based on other inputs or information gathered by the client device during the message creation process. Example of data filters include current temperature at a specific location, a current speed at which a sending user is traveling, battery life for a client device, the current time, or other data captured or received by the client device.

Other annotation data that may be stored within image table 908 can include "lens" data. A "lens" may be a real-time special effect and sound that may be added to an image or a video.

As discussed above, video table 910 stores video data which, in one embodiment, is associated with messages for which records are maintained within message table 914. Similarly, image table 908 stores image data associated with messages for which message data is stored in entity table 902. Entity table 902 may associate various annotations from annotation table 912 with various images and videos stored in image table 908 and video table 910.

Story table 906 stores data regarding collections of messages and associated image, video, or audio data, which are compiled into a collection (e.g., a story or a gallery). The creation of a particular collection may be initiated by a particular user (e.g., each user for which a record is maintained in entity table 902) A user may create a "personal story" in the form of a collection of content that has been created and sent/broadcast by that user. To this end, the user interface of client application 902 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. In some embodiments, users whose client devices have location services enabled and are at a common location event at a particular time may be presented with an option, via a user interface of client application 802, to contribute content to a particular live story. The live story may be identified to the user by client application 802 based on his location. The end result is a "live story" told from a community perspective.

A further type of content collection is known as a "location story", which enables a user whose client device is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 10:
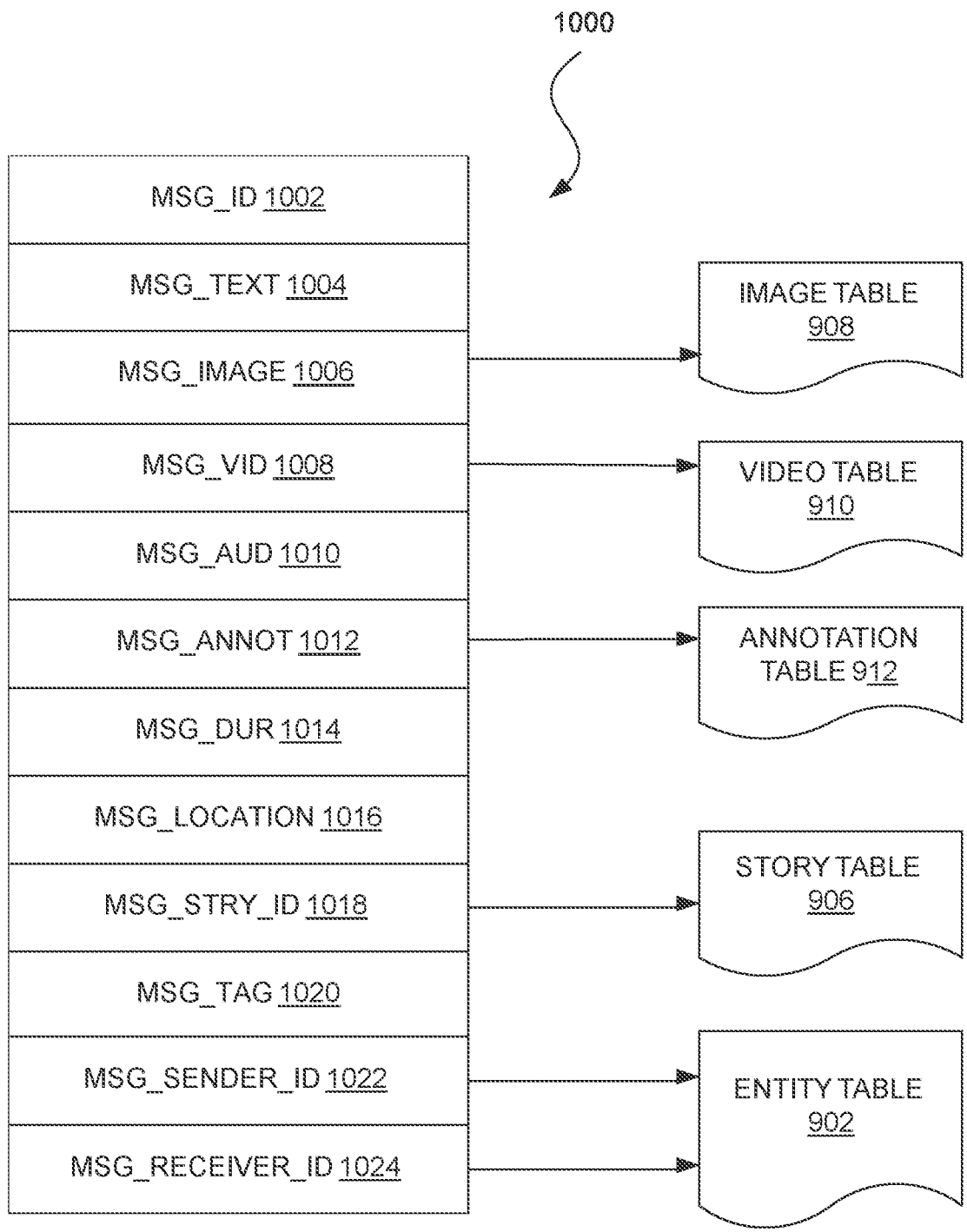
FIG. 10 illustrates an example of a data structure for a message in accordance with an embodiment.

FIG. 10 shows an example of a data structure of a message 1000 that a first client application (e.g., client application 802 of FIG. 8) may generate for communication to a second client application or a server application (e.g., content management system 702). The content of message 1000 can be used to populate message table 914 stored within data model 900 of FIG. 9 and may be accessible by client application 802. Similarly, the content of message 1000 can be stored in memory as "in-transit" or "in-flight" data of the client device or application server. Message 1000 is shown to include the following components:

Message identifier 1002: a unique identifier that identifies message 1000;

Message text payload 1004: text, to be generated by a user via a user interface of a client device and that is included in message 1000;

Message image payload 1006: image data, captured by a camera component of a client device or retrieved from memory of a client device, and that is included in message 1000;

Message video payload 1008: video data, captured by a camera component or retrieved from a memory component of a client device and that is included in message 1000;

Message audio payload 1010: audio data, captured by a microphone or retrieved from the memory component of a client device, and that is included in message 1000;

Message annotations 1012: annotation data (e.g., filters, stickers, or other enhancements) that represents annotations to be applied to message image payload 1006, message video payload 1008, or message audio payload 1010 of message 1000;

Message duration 1014: a parameter indicating, in seconds, the amount of time for which content of the message (e.g., message image payload 1006, message video payload 1008, message audio payload 1010) is to be presented or made accessible to a user via client application 1002;

Message geolocation 1016: geolocation data (e.g., latitudinal and longitudinal coordinates) associated with the content payload of the message. Multiple message geolocation parameter values may be included in the payload, each of these parameter values being associated with respect to content items included in the content (e.g., a specific image into within message image payload 1006, or a specific video in message video payload 1008);

Message story identifier 1018: identifier values identifying one or more content collections (e.g., "stories") with which a particular content item in message image payload 1006 of message 1000 is associated. For example, multiple images within message image payload 1006 may each be associated with multiple content collections using identifier values;

Message tag 1020: each message 1000 may be tagged with multiple tags, each of which is indicative of the subject matter of content included in the message payload. For example, where a particular image included in message image payload 1006 depicts an animal (e.g., a lion), a tag value may be included within message tag 1020 that is indicative of the relevant animal. Tag values may be generated manually, based on user input, or may be automatically generated using, for example, image recognition;

Message sender identifier 1022: an identifier (e.g., a messaging system identifier, email address or device identifier) indicative of a user of a client device on which message 1000 was generated and from which message 1000 was sent;

Message receiver identifier 1024: an identifier (e.g., a messaging system identifier, email address or device identifier) indicative of a user of a client device to which message 1000 is addressed;

The values or data of the various components of message 1000 may be pointers to locations in tables within which the values or data are stored. For example, an image value in message image payload 1006 may be a pointer to (or address of) a location within image table 908. Similarly, values within message video payload 1008 may point to data stored within video table 910, values stored within message annotations 912 may point to data stored in annotation table 912, values stored within message story identifier 1018 may point to data stored in story table 906, and values stored within message sender identifier 1022 and message receiver identifier 1024 may point to user records stored within entity table 902.

Figure 11:
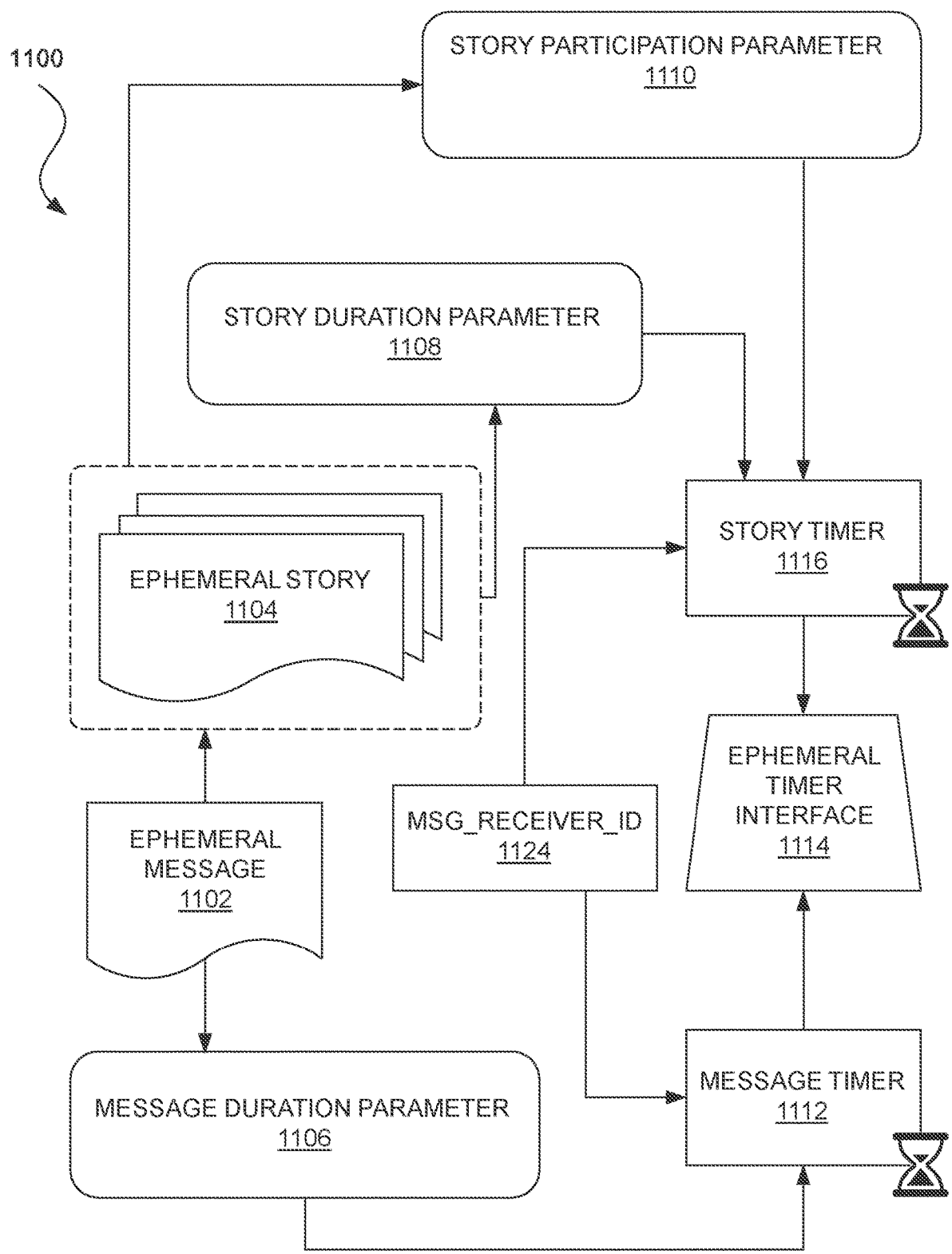
FIG. 11 illustrates an example of a data flow for time-limited content in accordance with an embodiment.

FIG. 11 shows an example of data flow 1100 in which access to content (e.g., ephemeral message 1102, and associated multimedia payload of data) and/or a content collection (e.g., ephemeral story 1104) may be time-limited (e.g., made ephemeral) by a content management system (e.g., content management system 702 of FIG. 7).

In this example, ephemeral message 1102 is shown to be associated with message duration parameter 1106, the value of which determines an amount of time that ephemeral message 1102 will be displayed to a receiving user of ephemeral message 1102 by a client application (e.g., client application 802 of FIG. 8). In one embodiment, where client application 802 is an application client, ephemeral message 1102 may be viewable by a receiving user for up to a maximum of 10 seconds that may be customizable by the sending user for a shorter duration.

Message duration parameter 1106 and message receiver identifier 1124 may be inputs to message timer 1112, which can be responsible for determining the amount of time that ephemeral message 1102 is shown to a particular receiving user identified by message receiver identifier 1124. For example, ephemeral message 1102 may only be shown to the relevant receiving user for a time period determined by the value of message duration parameter 1106. Message timer 1112 can provide output to ephemeral timer interface 1114 (e.g., an example of an implementation of ephemeral timer interface 1106), which can be responsible for the overall timing of the display of content (e.g., ephemeral message 1102) to a receiving user.

Ephemeral message 1102 is shown in FIG. 11 to be included within ephemeral story 1104 (e.g., a personal story, an event story, a content gallery, or other content collection). Ephemeral story 1104 maybe associated with story duration 1108, a value of which can establish a time-duration for which ephemeral story 1104 is presented and accessible to users of content management system 702. In an embodiment, story duration parameter 1108, may be the duration of a music concert, and ephemeral story 1104 may be a collection of content pertaining to that concert. Alternatively, a user (either the owning user or a curator) may specify the value for story duration parameter 1108 when performing the setup and creation of ephemeral story 1104.

In some embodiments, each ephemeral message 1102 within ephemeral story 1104 may be associated with story participation parameter 1110, a value of which can set forth the duration of time for which ephemeral message 1102 will be accessible within the context of ephemeral story 1104. For example, a particular ephemeral story may "expire" and become inaccessible within the context of ephemeral story 1104, prior to ephemeral story 1104 itself expiring in terms of story duration parameter 1108. Story duration parameter 1108, story participation parameter 1110, and message receiver identifier 1124 can each provide input to story timer 1116, which can control whether a particular ephemeral message of ephemeral story 1104 will be displayed to a particular receiving user and, if so, for how long. In some embodiments, ephemeral story 1104 may also be associated with the identity of a receiving user via message receiver identifier 1124.

In some embodiments, story timer 1116 can control the overall lifespan of ephemeral story 1104, as well as ephemeral message 1102 included in ephemeral story 1104. In an embodiment, each ephemeral message 1102 within ephemeral story 1104 may remain viewable and accessible for a time-period specified by story duration parameter 1108. In another embodiment, ephemeral message 1102 may expire, within the context of ephemeral story 1104, based on story participation parameter 1110. In some embodiments, message duration parameter 1106 can still determine the duration of time for which a particular ephemeral message is displayed to a receiving user, even within the context of ephemeral story 1104. For example, message duration parameter 1106 can set forth the duration of time that a particular ephemeral message is displayed to a receiving user, regardless of whether the receiving user is viewing that ephemeral message inside or outside the context of ephemeral story 1104.

Ephemeral timer interface 1114 may remove ephemeral message 1102 from ephemeral story 1104 based on a determination that ephemeral message 1102 has exceeded story participation parameter 1110. For example, when a sending user has established a story participation parameter of 24 hours from posting, ephemeral timer interface 1114 will remove the ephemeral message 1102 from ephemeral story 1104 after the specified 24 hours. Ephemeral timer interface 1114 can also remove ephemeral story 1104 either when story participation parameter 1110 for each ephemeral message 1102 within ephemeral story 1104 has expired, or when ephemeral story 1104 itself has expired in terms of story duration parameter 1108.

In an embodiment, a creator of ephemeral message story 1104 may specify an indefinite story duration parameter. In this case, the expiration of story participation parameter 1110 for the last remaining ephemeral message within ephemeral story 1104 will establish when ephemeral story 1104 itself expires. In an embodiment, a new ephemeral message may be added to the ephemeral story 1104, with a new story participation parameter to effectively extend the life of ephemeral story 1104 to equal the value of story participation parameter 1110.

In some embodiments, responsive to ephemeral timer interface 1114 determining that ephemeral story 1104 has expired (e.g., is no longer accessible), ephemeral timer interface 1114 can communicate with content management system 702 of FIG. 7 (and, for example, specifically client application 802 of FIG. 8 to cause an indicium (e.g., an icon) associated with the relevant ephemeral message story to no longer be displayed within a user interface of client application 802) Similarly, when ephemeral timer interface 1114 determines that message duration parameter 1106 for ephemeral message 1102 has expired, ephemeral timer interface 1114 may cause client application 802 to no longer display an indicium (e.g., an icon or textual identification) associated with ephemeral message 1102.

Figure 12:
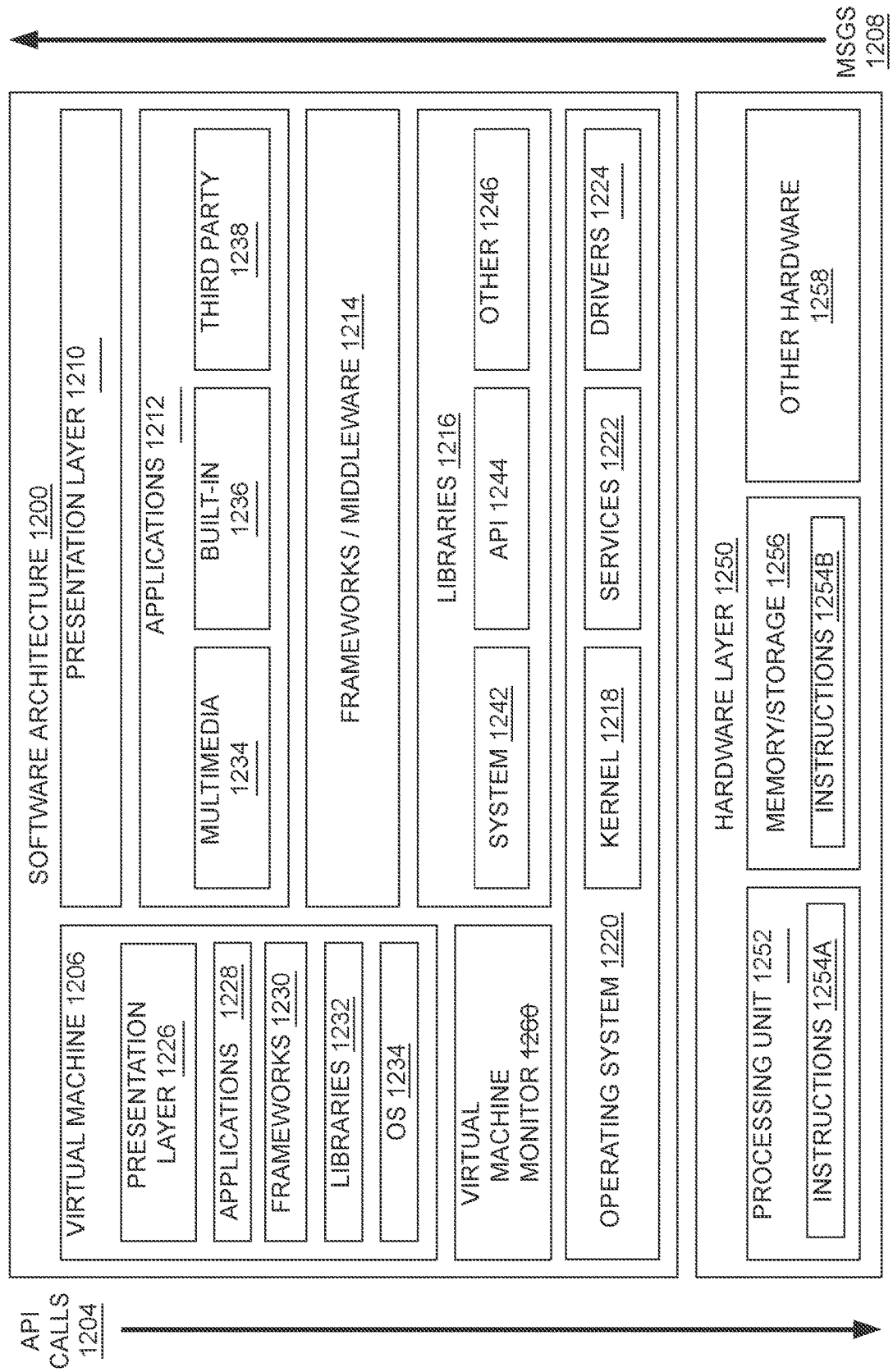
FIG. 12 illustrates an example of a software architecture in accordance with an embodiment.

FIG. 12 shows an example of software architecture 1200, which may be used in conjunction with various hardware architectures described herein. FIG. 12 is merely one example of a software architecture for implementing various embodiments of the present disclosure and other embodiments may utilize other architectures to provide the functionality described herein. Software architecture 1200 may execute on hardware such as computing system 1300 of FIG. 13, that includes processors 1304, memory/storage 1306, and I/O components 1318. Hardware layer 1250 can represent a computing system, such as computing system 1300 of FIG. 13. Hardware layer 1250 can include one or more processing units 1252 having associated executable instructions 1254A. Executable instructions 1254A can represent the executable instructions of software architecture 1200, including implementation of the methods, modules, and so forth of FIGS. 1, 2A and 2B, 3A-3D, 4A-4G, 5A-5F, and 6. Hardware layer 1250 can also include memory and/or storage modules 1256, which also have executable instructions 1254B. Hardware layer 1250 may also include other hardware 1258, which can represent any other hardware, such as the other hardware illustrated as part of computing system 1300.

In the example of FIG. 12, software architecture 1200 may be conceptualized as a stack of layers in which each layer provides particular functionality. For example, software architecture 1200 may include layers such as operating system 1220, libraries 1216, frameworks/middleware 1214, applications 1212, and presentation layer 1210. Operationally, applications 1212 and/or other components within the layers may invoke API calls 1204 through the software stack and receive a response, returned values, and so forth as messages 1208. The layers illustrated are representative in nature and not all software architectures have all layers. For example, some mobile or special-purpose operating systems may not provide a frameworks/middleware layer 1214, while others may provide such a layer. Other software architectures may include additional or different layers.

Operating system 1220 may manage hardware resources and provide common services. In this example, operating system 1220 includes kernel 1218, services 1222, and drivers 1224. Kernel 1218 may operate as an abstraction layer between the hardware and the other software layers. For example, kernel 1218 may be responsible for memory management, processor management (e.g., scheduling), component management, networking, security settings, and so on. Services 1222 may provide other common services for the other software layers. Drivers 1224 may be responsible for controlling or interfacing with the underlying hardware. For instance, drivers 1224 may include display drivers, camera drivers, Bluetooth drivers, flash memory drivers, serial communication drivers (e.g., Universal Serial Bus (USB) drivers), Wi-Fi drivers, audio drivers, power management drivers, and so forth depending on the hardware configuration.

Libraries 1216 may provide a common infrastructure that may be utilized by applications 1212 and/or other components and/or layers. Libraries 1216 typically provide functionality that allows other software modules to perform tasks in an easier fashion than to interface directly with the underlying operating system functionality (e.g., kernel 1218, services 1222, and/or drivers 1224). Libraries 1216 may include system libraries 1242 (e.g., C standard library) that may provide functions such as memory allocation functions, string manipulation functions, mathematic functions, and the like. In addition, libraries 1216 may include API libraries 1244 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphics for display), database libraries (e.g., SQLite that may provide various relational database functions), web libraries (e.g., WebKit that may provide web browsing functionality), and the like. Libraries 1216 may also include a wide variety of other libraries 1246 to provide many other APIs to applications 1212 and other software components/modules.

Frameworks 1214 (sometimes also referred to as middleware) may provide a higher-level common infrastructure that may be utilized by applications 1212 and/or other software components/modules. For example, frameworks 1214 may provide various graphic user interface (GUI) functions, high-level resource management, high-level location services, and so forth. Frameworks 1214 may provide a broad spectrum of other APIs that may be utilized by applications 1212 and/or other software components/modules, some of which may be specific to a particular operating system or platform.

Applications 1212 include multimedia editing and distribution application 1234, built-in applications 1236, and/or third-party applications 1238. Examples of representative built-in applications 1236 include a contacts application, a browser application, a book reader application, a location application, a media application, a messaging application, and/or a game application. Third-party applications 1238 may include any built-in applications 1236 as well as a broad assortment of other applications. In an embodiment, third-party application 1238 (e.g., an application developed using the ANDROID™ or IOS® software development kit (SDK) by an entity other than the vendor of the particular platform) may be mobile software running on a mobile operating system such as IOS®, ANDROID™, WINDOWS PHONE®, or other mobile operating systems. In this example, third-party application 1238 may invoke API calls 1204 provided by operating system 1220 to facilitate functionality described herein.

Applications 1212 may utilize built-in operating system functions (e.g., kernel 1218, services 1222, and/or drivers 1224), libraries (e.g., system libraries 1242, API libraries 1244, and other libraries 1246), or frameworks/middleware 1214 to create user interfaces to interact with users of the system. Alternatively, or in addition, interactions with a user may occur through presentation layer 1210. In these systems, the application/module "logic" can be separated from the aspects of the application/module that interact with a user.

Some software architectures utilize virtual machines. In the example of FIG. 12, this is illustrated by virtual machine 1206. A virtual machine creates a software environment where applications/modules can execute as if they were executing on a physical computing device (e.g., computing system 1300 of FIG. 13). Virtual machine 1206 can be hosted by a host operating system (e.g., operating system 1220). The host operating system typically has a virtual machine monitor 1260, which may manage the operation of virtual machine 1206 as well as the interface with the host operating system (e.g., operating system 1220). A software architecture executes within virtual machine 1206, and may include operating system 1234, libraries 1232, frameworks/middleware 1230, applications 1228, and/or presentation layer 1226. These layers executing within virtual machine 1206 can operate similarly or differently to corresponding layers previously described.

Figure 13:
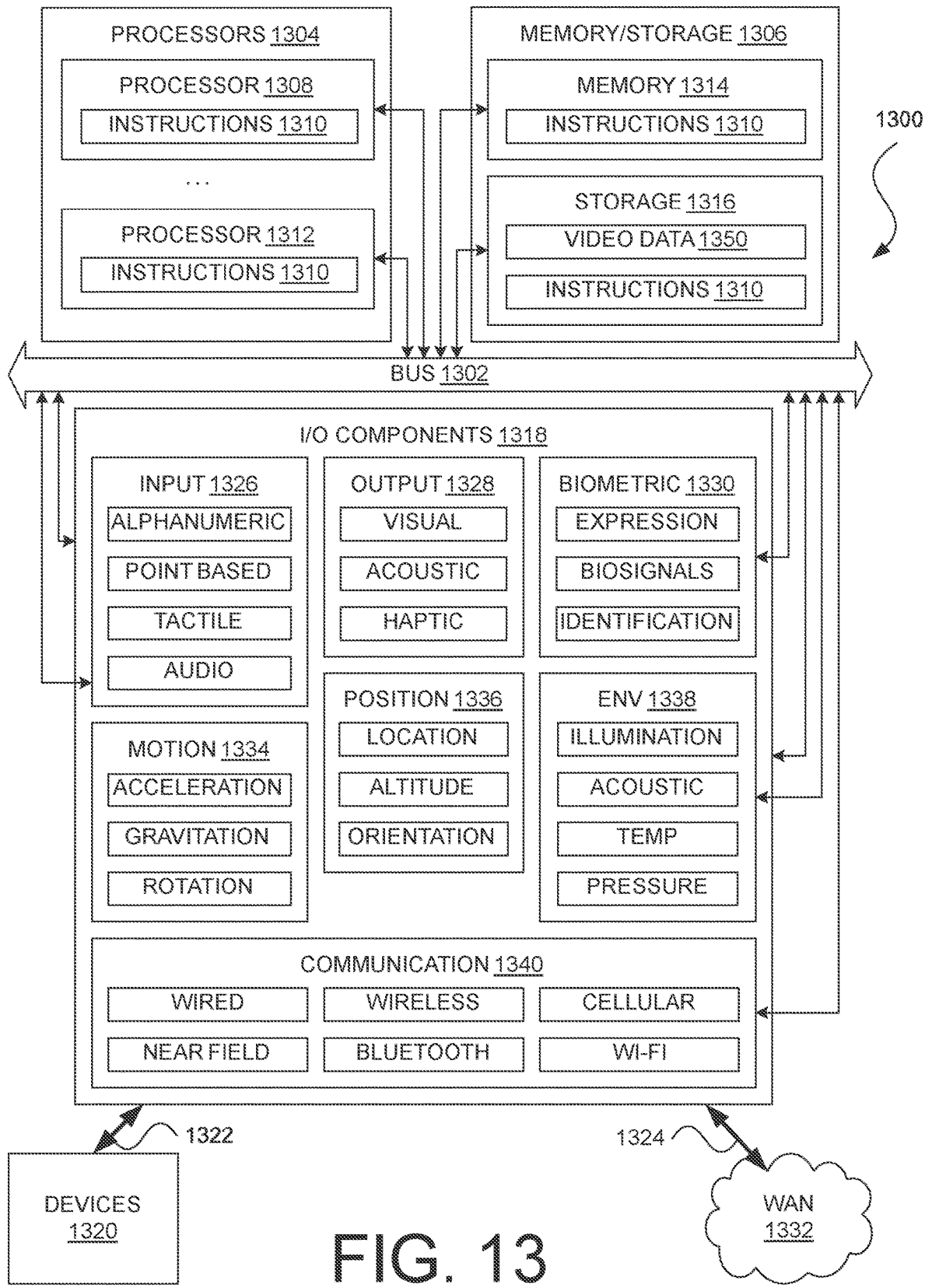
FIG. 13 illustrates an example of a computing system in accordance with an embodiment.

FIG. 13 shows an example of a computing device, computing system 1300, in which various embodiments of the present disclosure may be implemented. In this example, computing system 1300 can read instructions 1310 from a computer-readable medium (e.g., a computer-readable storage medium) and perform any one or more of the methodologies discussed herein. Instructions 1310 may include software, a program, an application, an applet, an app, or other executable code for causing computing system 1300 to perform any one or more of the methodologies discussed herein. For example, instructions 1310 may cause computing system 1300 to execute process 400 of FIG. 4. In addition or alternatively, instructions 1310 may execute process 500 of FIG. 5, graphical user interfaces of FIG. 1A-1F or 2A-2F, the logic for content discovery feed refreshing, of FIGS. 3A-3D; application logic modules 712 or video modules 714 of FIG. 7; multimedia editing and distribution application 1234 of FIG. 12, and so forth. Instructions 1310 can transform a general, non-programmed computer, such as computing system 1300 into a particular computer programmed to carry out the functions described herein.

In some embodiments, computing system 1300 can operate as a standalone device or may be coupled (e.g., networked) to other devices. In a networked deployment, computing system 1300 may operate in the capacity of a server or a client device in a server-client network environment, or as a peer device in a peer-to-peer (or distributed) network environment. Computing system 1300 may include a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing instructions 1310, sequentially or otherwise, that specify actions to be taken by computing system 1300. Further, while a single device is illustrated in this example, the term "device" shall also be taken to include a collection of devices that individually or jointly execute instructions 1310 to perform any one or more of the methodologies discussed herein.

Computing system 1300 may include processors 1304, memory/storage 1306, and I/O components 1318, which may be configured to communicate with each other such as via bus 1302. In some embodiments, processors 1304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio frequency integrated circuit (RFIC), another processor, or any suitable combination thereof) may include processor 1308 and processor 1312 for executing some or all of instructions 1310. The term "processor" is intended to include a multi-core processor that may comprise two or more independent processors (sometimes also referred to as "cores") that may execute instructions contemporaneously. Although FIG. 13 shows multiple processors 1304, computing system 1300 may include a single processor with a single core, a single processor with multiple cores (e.g., a multi-core processor), multiple processors with a single core, multiple processors with multiples cores, or any combination thereof.

Memory/storage 1306 may include memory 1314 (e.g., main memory or other memory storage) and storage 1316 (e.g., a hard-disk drive (HDD) or solid-state device (SSD) may be accessible to processors 1304, such as via bus 1302. Storage 1316 and memory 1314 store instructions 1310, which may embody any one or more of the methodologies or functions described herein. Storage 1316 may also store video data 1350, including spherical video data, edited video, and other data discussed in the present disclosure. Instructions 1310 may also reside, completely or partially, within memory 1314, within storage 1316, within processors 1304 (e.g., within the processor's cache memory), or any suitable combination thereof, during execution thereof by computing system 1300. Accordingly, memory 1314, storage 1316, and the memory of processors 1304 are examples of computer-readable media.

As used herein, "computer-readable medium" means an object able to store instructions and data temporarily or permanently and may include random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" may include a single medium or multiple media (e.g., a centralized or distributed database, or associated caches and servers) able to store instructions 1310. The term "computer-readable medium" can also include any medium, or combination of multiple media, that is capable of storing instructions (e.g., instructions 1310) for execution by a computer (e.g., computing system 1300), such that the instructions, when executed by one or more processors of the computer (e.g., processors 1304), cause the computer to perform any one or more of the methodologies described herein. Accordingly, a "computer-readable medium" refers to a single storage apparatus or device, as well as "cloud-based" storage systems or storage networks that include multiple storage apparatus or devices. The term "computer-readable medium" excludes signals per se.

I/O components 1318 may include a wide variety of components to receive input, provide output, produce output, transmit information, exchange information, capture measurements, and so on. The specific I/O components included in a particular device will depend on the type of device. For example, portable devices such as mobile phones will likely include a touchscreen or other such input mechanisms, while a headless server will likely not include a touch sensor. In some embodiments, I/O components 1318 may include output components 1326 and input components

1328. Output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1318 may include alphanumeric input components (e.g., a keyboard, a touch screen configured to receive alphanumeric input, a photo-optical keyboard, or other alphanumeric input components), pointer-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In some embodiments, I/O components 1318 may also include biometric components 1330, motion components 1334, position components 1336, or environmental components 1338, or among a wide array of other components. For example, biometric components 1330 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. Motion components 1334 may include acceleration sensor components (e.g., accelerometer), gravitation sensor components, rotation sensor components (e.g., gyroscope), and so forth. Position components 1336 may include location sensor components (e.g., a Global Position System (GPS) receiver component), altitude sensor components (e.g., altimeters or barometers that detect air pressure from which altitude may be derived), orientation sensor components (e.g., magnetometers), and the like. Environmental components 1338 may include illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

Communication may be implemented using a wide variety of technologies. I/O components 1318 may include communication components 1340 operable to couple computing system 1300 to WAN 1332 or devices 1320 via coupling 1324 and coupling 1322 respectively. For example, communication components 1340 may include a network interface component or other suitable device to interface with WAN 1332. In some embodiments, communication components 1340 may include wired communication components, wireless communication components, cellular communication components, Near Field Communication (NFC) components, Bluetooth components (e.g., Bluetooth Low Energy), Wi-Fi components, and other communication components to provide communication via other modalities. Devices 1320 may be another client device or any of a wide variety of peripheral devices (e.g., a peripheral device coupled via USB).

Moreover, communication components 1340 may detect identifiers or include components operable to detect identifiers. For example, communication components 1340 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via communication components 1340, such as location via Internet Protocol (IP) geolocation, location via Wi-Fi signal triangulation, location via detecting an NFC beacon signal that may indicate a particular location, and so forth.

In various embodiments, one or more portions of WAN 1332 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi network, another type of network, or a combination of two or more such networks. For example, WAN 1332 or a portion of WAN 1332 may include a wireless or cellular network and coupling 1324 may be a Code Division Multiple Access (CDMA) connection, a Global System for Mobile communications (GSM) connection, or another type of cellular or wireless coupling. In this example, coupling 1324 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

Instructions 1310 may be transmitted or received over WAN 1332 using a transmission medium via a network interface device (e.g., a network interface component included in communication components 1340) and utilizing any one of several well-known transfer protocols (e.g., HTTP). Similarly, instructions 1310 may be transmitted or received using a transmission medium via coupling 1322 (e.g., a peer-to-peer coupling) to devices 1320. The term "transmission medium" includes any intangible medium that is capable of storing, encoding, or carrying instructions 1310 for execution by computing system 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
    causing, by one or more processors of a client device, a content discovery feed page to be displayed by a display screen of the client device, the content discovery feed page comprising a menu comprising a plurality of interactive user interface elements each associated to a content, wherein an activation of one of the plurality of user interface elements causes display of its associated content, the plurality of interactive user interface elements being displayed in a first order;
    determining, by the one or more processors of the client device, that a re-ordering condition for re-ordering the displayed plurality of interactive user interface elements has been satisfied, the re-ordering condition comprising:
        identifying an interactive user interface element of the plurality of interactive user interface elements based on a user associated with the content discovery feed page, the identified interactive user interface element comprising a first content item and a second content item;
        determining that the identified interactive user interface element has not been activated within a period of time; and
        generating a second interactive user interface element, the second interactive user interface element comprising the second content item;
    modifying at least one interactive user interface element of the plurality of interactive user interface elements using its associated content in response to determining that the re-ordering condition has been satisfied;
    transmitting a request to a content sharing network for new content items in response to determining that the re-ordering condition has been satisfied;
    detecting, during transmission of the request, a user interaction with the content discovery feed;
    causing display of an interactive user interface element and an indication that the new content items are available for viewing on the display screen, wherein the interactive user interface element disappears from the display screen upon detecting an interaction with the interactive user interface element;
    receiving the new content items in response to detecting an interaction with the interactive user interface element;
    determining that a time elapsed since a last time the menu was displayed on the display screen of the client device surpasses a first threshold;
    in response to determining that a time elapsed since a last time the menu was displayed on the display screen of the client device does not surpasses a first threshold:
    determining that a time elapsed since a last time the menu was displayed on the display screen of the client device surpasses a second threshold; and
    in response to determining that a time elapsed since a last reordering of the plurality of interactive user interface elements surpasses the second threshold:
        determining a second order for the plurality of interactive user interface elements and one or more new interactive user interface elements representing the new content items; and
        updating the menu to comprise the plurality of interactive user interface elements and the one or more new interactive user interface elements in the second order.

2. The computer-implemented method of claim 1, wherein the first order and the second order are based on one or more of a relevance of a content item associated to an interactive user interface element to a user of the client device, characteristics of the content item, geographic proximity of the content item to the user, and observed trends of a content sharing network.

3. The computer-implemented method of claim 1, further comprising:
    determining that a content associated with a first interactive user interface element among the plurality of interactive user interface elements and the one or more new interactive user interface elements has been displayed on the display screen; and
    removing the first interactive user interface element from the plurality of interactive user interface elements.

4. The computer-implemented method of claim 1, further comprising:
    determining that a content associated with a first interactive user interface element among the plurality of interactive user interface elements and the one or more new interactive user interface elements has been displayed on the display screen; and wherein
    determining the second order for the plurality of interactive user interface elements and one or more new interactive user interface elements representing the one or more new content items, comprises:
    ranking the first interactive user interface element as the last interactive user interface element.

5. The computer-implemented method of claim 1, wherein a first content associated to a first interactive user interface element among the plurality of interactive user interface elements belongs to a set of contents, the set of contents further including a second content associated to a second interactive user interface element, the method further comprising:
  determining that the first content has been displayed on the display screen; and
  replacing, in the plurality of interactive user interface elements, the first interactive user interface element with the second interactive user interface element.

6. The computer-implemented method of claim 1, further comprising:
  cropping one or more first interactive user interface elements of the plurality of interactive user interface elements by a predetermined amount when displaying the plurality of interactive user interface elements in the first order; and
  cropping one or more second interactive user interface elements among the plurality of interactive user interface elements and the one or more new interactive user interface elements when displaying the plurality of interactive user interface elements in the second order.

7. The computer-implemented method of claim 1, wherein determining, by the one or more processors of the client device, the re-ordering condition for re-ordering the plurality of interactive user interface elements has been satisfied, comprises:
  determining that a time elapsed since a last time the menu was displayed on the display screen of the client device surpasses a threshold.

8. A system comprising:
  a memory having instructions embodied thereon; and
  at least one processor of a machine configured by the instructions to perform operations comprising:
  causing, by one or more processors of a client device, a content discovery feed page to be displayed by a display screen of the client device, the content discovery feed page comprising a menu comprising a plurality of interactive user interface elements each associated to a content, wherein an activation of one of the plurality of user interface elements causes display of its associated content, the plurality of interactive user interface elements being displayed in a first order;
  determining, by the one or more processors of the client device, that a re-ordering condition for re-ordering the displayed plurality of interactive user interface elements has been satisfied, the re-ordering condition comprising
  identifying an interactive user interface element of the plurality of interactive user interface elements based on a user associated with the content discovery feed page, the identified interactive user interface element comprising a first content item and a second content item;
  determining that the identified interactive user interface element has not been activated within a period of time; and
  generating a second interactive user interface element, the second interactive user interface element comprising the second content item;
  modifying at least one interactive user interface element of the plurality of interactive user interface elements using its associated content in response to determining that the re-ordering condition has been satisfied;
  transmitting a request to a content sharing network for new content items in response to determining that the re-ordering condition has been satisfied;
  detecting, during transmission of the request, a user interaction with the content discovery feed;
  causing display of an interactive user interface element and an indication that the new content items are available for viewing on the display screen, wherein the interactive user interface element disappears from the display screen upon detecting an interaction with the interactive user interface element;
  receiving the new content items in response to detecting an interaction with the interactive user interface element;
  determining that a time elapsed since a last time the menu was displayed on the display screen of the client device surpasses a first threshold;
  in response to determining that a time elapsed since a last time the menu was displayed on the display screen of the client device does not surpasses a first threshold:
  determining that a time elapsed since a last time the menu was displayed on the display screen of the client device surpasses a second threshold; and
  in response to determining that a time elapsed since a last reordering of the plurality of interactive user interface elements surpasses the second threshold:
    determining a second order for the plurality of interactive user interface elements and one or more new interactive user interface elements representing the new content items; and
    updating the menu to comprise the plurality of interactive user interface elements and the one or more new interactive user interface elements in the second order.

9. The system of claim 8, wherein the first order and the second order are based on one or more of a relevance of a content item associated to an interactive user interface element to a user of the client device, characteristics of the content item, geographic proximity of the content item to the user, and observed trends of a content sharing network.

10. The system of claim 8, the operations further comprising:
  determining that a content associated with a first interactive user interface element among the plurality of interactive user interface elements and the one or more new interactive user interface elements has been displayed on the display screen; and
  removing the first interactive user interface element from the plurality of interactive user interface elements.

11. The system of claim 8, the operations further comprising:
  determining that a content associated with a first interactive user interface element among the plurality of interactive user interface elements and the one or more new interactive user interface elements has been displayed on the display screen; and wherein
  determining the second order for the plurality of interactive user interface elements and one or more new interactive user interface elements representing the one or more new content items, comprises:
  ranking the first interactive user interface element as the last interactive user interface element.

12. The system of claim 8, wherein a first content associated to a first interactive user interface element among the plurality of interactive user interface elements belongs to a set of contents, the set of contents further including a second content associated to a second interactive user interface element, the operations further comprising:
  determining that the first content has been displayed on the display screen; and replacing, in the plurality of interactive user interface elements, the first interactive user interface element with the second interactive user interface element.

13. The system of claim 8, the operations further comprising:
cropping one or more first interactive user interface elements of the plurality of interactive user interface elements by a predetermined amount when displaying the plurality of interactive user interface elements in the first order; and
cropping one or more second interactive user interface elements among the plurality of interactive user interface elements and the one or more new interactive user interface elements when displaying the plurality of interactive user interface elements in the second order.

14. The system of claim 8, wherein determining, by the one or more processors of the client device, the re-ordering condition for re-ordering the plurality of interactive user interface elements has been satisfied, comprises:
determining that a time elapsed since a last time the menu was displayed on the display screen of the client device surpasses a threshold.

15. A non-transitory computer readable medium comprising instructions that, when executed by one or more processors of a device, cause the device to perform operations comprising:
causing, a content discovery feed page to be displayed by a display screen of the client device, the content discovery feed page comprising a menu comprising a plurality of interactive user interface elements each associated to a content, wherein an activation of one of the plurality of user interface elements causes display of its associated content, the plurality of interactive user interface elements being displayed in a first order;
determining that a re-ordering condition for re-ordering the displayed plurality of interactive user interface elements has been satisfied, the re-ordering condition comprising
identifying an interactive user interface element of the plurality of interactive user interface elements based on a user associated with the content discovery feed page, the identified interactive user interface element comprising a first content item and a second content item;
determining that the identified interactive user interface element has not been activated within a period of time; and
generating a second interactive user interface element, the second interactive user interface element comprising the second content item;
modifying at least one interactive user interface element of the plurality of interactive user interface elements using its associated content in response to determining that the re-ordering condition has been satisfied;
transmitting a request to a content sharing network for new content items in response to determining that the re-ordering condition has been satisfied;
detecting, during transmission of the request, a user interaction with the content discovery feed;
causing display of an interactive user interface element and an indication that the new content items are available for viewing on the display screen, wherein the interactive user interface element disappears from the display screen upon detecting an interaction with the interactive user interface element;
receiving the new content items in response to detecting an interaction with the interactive user interface element;
determining that a time elapsed since a last time the menu was displayed on the display screen of the client device surpasses a first threshold;
in response to determining that a time elapsed since a last time the menu was displayed on the display screen of the client device does not surpasses a first threshold:
determining that a time elapsed since a last time the menu was displayed on the display screen of the client device surpasses a second threshold; and
in response to determining that a time elapsed since a last reordering of the plurality of interactive user interface elements surpasses the second threshold:
determining a second order for the plurality of interactive user interface elements and one or more new interactive user interface elements representing the new content items; and
updating the menu to comprise the plurality of interactive user interface elements and the one or more new interactive user interface elements in the second order.

16. The medium of claim 15, the operations further comprising:
determining that a content associated with a first interactive user interface element among the plurality of interactive user interface elements and the one or more new interactive user interface elements has been displayed on the display screen; and
removing the first interactive user interface element from the plurality of interactive user interface elements.

17. The medium of claim 15, the operations further comprising:
determining that a content associated with a first interactive user interface element among the plurality of interactive user interface elements and the one or more new interactive user interface elements has been displayed on the display screen; and wherein determining the second order for the plurality of interactive user interface elements and one or more new interactive user interface elements representing the one or more new content items, comprises:
ranking the first interactive user interface element as the last interactive user interface element.

\* \* \* \* \*

UNITED STATES PATENT AND TRADEMARK OFFICE
CERTIFICATE OF CORRECTION

| | | |
|---|---|---|
| PATENT NO. | : 11,460,974 B1 | Page 1 of 1 |
| APPLICATION NO. | : 16/110830 | |
| DATED | : October 4, 2022 | |
| INVENTOR(S) | : Michael Brian Murray | |

It is certified that error appears in the above-identified patent and that said Letters Patent is hereby corrected as shown below:

On the Title Page

On page 2, in Column 2, under "U.S. Patent Documents", Line 10, delete "2005/0020661" and insert --2005/0206610-- therefor On page 3, in Column 1, under "U.S. Patent Documents", Line 15, delete "2019/0122341" and insert --2019/0001223-- therefor In the Claims In Column 33, Line 47, in Claim 8, after "comprising", insert --:--

In Column 35, Line 38, in Claim 15, after "comprising", insert --:--

In Column 36, Line 48, in Claim 17, after "wherein", insert a linebreak

Signed and Sealed this
Twenty-fifth Day of July, 2023

Katherine Kelly Vidal
*Director of the United States Patent and Trademark Office*